(12) United States Patent
Pallakonda et al.

(10) Patent No.: US 12,093,294 B1
(45) Date of Patent: Sep. 17, 2024

(54) EDGE COMPUTING UNITS FOR OPERATING CONVERSATIONAL TOOLS AT LOCAL SITES

(71) Applicant: Armada Systems, Inc., San Francisco, CA (US)

(72) Inventors: Venkata Bhanu Teja Pallakonda, Bryan, TX (US); Pragyana K. Mishra, Seattle, WA (US)

(73) Assignee: Armada Systems, Inc., San Francisco, CA (US)

( * ) Notice: Subject to any disclaimer, the term of this patent is extended or adjusted under 35 U.S.C. 154(b) by 0 days.

(21) Appl. No.: 18/612,959

(22) Filed: Mar. 21, 2024

Related U.S. Application Data

(63) Continuation of application No. 18/482,839, filed on Oct. 6, 2023, now Pat. No. 11,960,515.

(51) Int. Cl.
G06F 16/332 (2019.01)
G06F 16/33 (2019.01)
G06F 40/30 (2020.01)

(52) U.S. Cl.
CPC ...... G06F 16/3329 (2019.01); G06F 16/3344 (2019.01); G06F 40/30 (2020.01)

(58) Field of Classification Search
CPC ... G06F 16/3329; G06F 16/3344; G06F 40/30
See application file for complete search history.

(56) References Cited

U.S. PATENT DOCUMENTS 10,419,106 B1  9/2019  Liu et al.
10,438,094 B1  10/2019  Ko et al.
(Continued)

FOREIGN PATENT DOCUMENTS

EP  0611500 B1  7/1999
WO  2019112667 A1  6/2019

OTHER PUBLICATIONS

Brown, Tom B., et al. "Language models are few-shot learners." Advances in Neural Information Processing Systems 33 (2020): 1877-1901.
(Continued)

*Primary Examiner* — Eric Yen
(74) *Attorney, Agent, or Firm* — Athorus, PLLC

(57) ABSTRACT

Computing units provided at local sites or edge locations are programmed to execute conversational tools that generate pertinent, domain-specific responses to queries received from workers at such sites or locations. The conversational tools are large language models that are trained with domain-specific knowledge documents. Data representing queries are received from workers at such sites or locations and provided as inputs to the conversational tools along with text representing nearest knowledge documents from a knowledge base associated with the domain, as well as contextual data. Responses identified based on outputs received from the conversational tools in response to the inputs are provided to the workers that generated the queries. Where subsequent queries are received from the workers, responses to the subsequent queries are identified based on the subsequent queries, nearest knowledge documents, contextual data, and conversational histories including previously received queries and responses to such queries.

20 Claims, 28 Drawing Sheets

(56) References Cited

U.S. PATENT DOCUMENTS

| | | | |
|---|---|---|---|
| 10,657,461 | B2 | 5/2020 | McMahan et al. |
| 11,016,997 | B1 | 5/2021 | Huang et al. |
| 11,238,849 | B1 | 2/2022 | Mimassi |
| 11,544,317 | B1 | 1/2023 | Pancha et al. |
| 11,743,344 | B1 | 8/2023 | Sivaswamy et al. |
| 11,971,914 | B1 | 4/2024 | Watson et al. |
| 2015/0120749 | A1 | 4/2015 | Phanishayee et al. |
| 2017/0221072 | A1 | 8/2017 | AthuluruTlrumala et al. |
| 2017/0364539 | A1 | 12/2017 | Jacob et al. |
| 2018/0032915 | A1 | 2/2018 | Nagaraju et al. |
| 2018/0196800 | A1 | 7/2018 | Volkovs et al. |
| 2018/0341720 | A1 | 11/2018 | Bhatia et al. |
| 2019/0087960 | A1 | 3/2019 | Jang et al. |
| 2019/0156246 | A1 | 5/2019 | Kuo et al. |
| 2019/0210742 | A1 | 7/2019 | Satak et al. |
| 2019/0258747 | A1 | 8/2019 | Milev |
| 2019/0370686 | A1 | 12/2019 | Pezzillo et al. |
| 2020/0027033 | A1 | 1/2020 | Garg et al. |
| 2020/0065966 | A1 | 2/2020 | Spencer et al. |
| 2020/0075027 | A1 | 3/2020 | Arantes et al. |
| 2020/0136994 | A1 | 4/2020 | Doshi et al. |
| 2020/0160207 | A1 | 5/2020 | Song et al. |
| 2020/0175046 | A1 | 6/2020 | Wang et al. |
| 2020/0184012 | A1 | 6/2020 | Stoyanovsky et al. |
| 2020/0198739 | A1 | 6/2020 | Sheldon-Coulson et al. |
| 2020/0228602 | A1 | 7/2020 | Spoczynski et al. |
| 2020/0267053 | A1 | 8/2020 | Zheng et al. |
| 2020/0374974 | A1 | 11/2020 | Sun et al. |
| 2020/0379805 | A1 | 12/2020 | Porter et al. |
| 2020/0401891 | A1 | 12/2020 | Xu et al. |
| 2021/0034677 | A1 | 2/2021 | Lee et al. |
| 2021/0109956 | A1 | 4/2021 | Su et al. |
| 2021/0216577 | A1 | 7/2021 | Xiao et al. |
| 2021/0232613 | A1* | 7/2021 | Raval Contractor .... G06N 5/02 |
| 2021/0382923 | A1 | 12/2021 | Gragnani et al. |
| 2021/0406306 | A1 | 12/2021 | Ambwani et al. |
| 2022/0019422 | A1 | 1/2022 | Anderson |
| 2022/0035878 | A1 | 2/2022 | Sarah et al. |
| 2022/0036890 | A1 | 2/2022 | Yuan et al. |
| 2022/0060455 | A1 | 2/2022 | Rosenstein et al. |
| 2022/0150125 | A1 | 5/2022 | Kumar et al. |
| 2022/0247678 | A1 | 8/2022 | Atwal et al. |
| 2022/0269856 | A1* | 8/2022 | Nomoto ........... G06V 30/19147 |
| 2022/0292123 | A1 | 9/2022 | Hoppe |
| 2022/0345518 | A1 | 10/2022 | Sgobba et al. |
| 2022/0374459 | A1 | 11/2022 | Liu et al. |
| 2022/0405484 | A1 | 12/2022 | Kanchibhotla et al. |
| 2023/0021216 | A1 | 1/2023 | Shilawat et al. |
| 2023/0139831 | A1 | 5/2023 | Wang et al. |
| 2023/0153531 | A1 | 5/2023 | Geng et al. |
| 2023/0176829 | A1 | 6/2023 | Rahmani et al. |
| 2023/0208869 | A1 | 6/2023 | Bisht et al. |
| 2023/0244934 | A1 | 8/2023 | Lazaridou et al. |
| 2023/0267126 | A1 | 8/2023 | Frieder et al. |
| 2023/0267267 | A1 | 8/2023 | Sukla |
| 2023/0300195 | A1 | 9/2023 | Sharma et al. |
| 2023/0315766 | A1 | 10/2023 | Cho et al. |
| 2024/0013928 | A1 | 1/2024 | Khan et al. |
| 2024/0070434 | A1 | 2/2024 | Garg et al. |
| 2024/0095275 | A1 | 3/2024 | Tambi et al. |
| 2024/0104131 | A1 | 3/2024 | Tambi et al. |
| 2024/0161520 | A1 | 5/2024 | Li et al. |

OTHER PUBLICATIONS

Devlin, J. et al., 2018, BERT: Pre-training of Deep Bidirectional Transformers for Language Understanding. CoRR abs/1810.04805 (2018), arXiv:1810.04805, Retrieved: https://arxiv.org/pdf/1810.04805v1.pdf, 14 pages.

Dinh, T., et al. 2022. LIFT: Language-interfaced fine-tuning for non-language machine learning tasks. Advances in Neural Information Processing Systems 35 (2022), 11763-11784. URL: https://proceedings.neurips.cc/paper_files/paper/2022/file/4ce7fe1d2730f53cb3857032952cd1b8-Paper-Conference.pdf.

Goodfellow, Ian, Jean Pouget-Abadie, Mehdi Mirza, Bing Xu, David Warde-Farley, Sherjil Ozair, Aaron Courville, and Yoshua Bengio. "Generative adversarial nets." Advances in Neural Information Processing Systems 27 (2014). URL: https://proceedings.neurips.cc/paper_files/paper/2014/file/5ca3e9b122f61f8f06494c97b1afccf3-Paper.pdf.

Gupta et al., "Using Closed Captions to Train Activity Recognizers that Improve Video Retrieval", 2009 IEEE Computer Society Conference on Computer Vision and Pattern Recognition (Year: 2009).

Hsu, Tz-Heng, Zhi-Hao Wang, and Aaron Raymond See, "A cloud-edge-smart IoT architecture for speeding up the deployment of neural network models with transfer learning techniques." Electronics 11.14: 2255. (Year: 2002).

Huang, L., et al. Armada: A Robust Latency-Sensitive Edge Cloud in Heterogeneous Edge-Dense Environments. arXiv:2111.12002 [cs.DC] Nov. 23, 2021. URL: https://arxiv.org/pdf/2111.12002.pdf, 13 pages.

Huang, Lei. "Armada: A robust latency-sensitive edge cloud in heterogeneous edge-dense environments." PhD diss., University of Minnesota, 2021, 55 pages.

Kulkarni et al., "BabyTalk: Understanding and Generating Simple Image Descriptions", IEEE Transactions on Pattern Analysis and Machine Intelligence, vol. 35, No. 12, Dec. 2013 (Year: 2013).

Lauter, K., et al., "Can Homomorphic Encryption be Practical?", Proceedings of the 3rd ACM Cloud Computing Security Workshop, CCSW 2011, Chicago, IL, USA, Oct. 21, 2011, 18 pages.

Li, Xiang Lisa and Percy Liang. "Prefix-tuning: Optimizing continuous prompts for generation." arXiv preprint arXiv:2101.00190 (2021). URL: https://arxiv.org/pdf/2101.00190.pdf.

Luketina, Jelena, Nantas Nardelli, Gregory Farquhar, Jakob Foerster, Jacob Andreas, Edward Grefenstette, Shimon Whiteson, and Tim Rocktaschel. "A survey of reinforcement learning informed by natural language." arXiv preprint arXiv: 1906.03926 (2019). URL: https://arxiv.org/pdf/1906.03926.pdf.

Mager, Manuel, Ramon Fernandez Astudillo, Tahira Naseem, Md Arafat Sultan, Young-Suk Lee, Radu Florian, and Salim Roukos. "GPT-too: A language-model-first approach for AMR-to-text generation." arXiv preprint arXiv:2005.09123 (2020). URL: https://arxiv.org/pdf/2005.09123.pdf.

OpenAI. [n. d.]. Introducing ChatGPT. www.openai.com, OpenAI, L.L.C. Accessed Oct. 17, 2023, URL: https://openai.com/blog/chatgpt/.

OpenAI. GPT-4 Technical Report. OpenAI. arXiv:2303.08774 (2023). URL: https://arxiv.org/pdf/2303.08774.pdf.

Radford, A. et al., 2018, Language Models are Unsupervised Multitask Learners, (2018) Retrieved: https://d4mucfpksywv.cloudfront.net/better-language-models/language_models_are_unsupervised_multitask_learners.pdf, 24 pages.

Ramos, Juan. "Using TF-IDF to determine word relevance in document queries." In Proceedings of the First Instructional Conference on Machine Learning, vol. 242., No. 1, 2003. URL: https://citeseerx.ist.psu.edu/document?repid=rep1&type=pdf&doi=b3bf6373ff41a115197cb5b30e57830c16130c2c.

Sharma, Mandar, Ajay Gogineni and Naren Ramakrishnan. "Innovations in neural data-to-text generation: A Survey." arXiv preprint arXiv:2207.12571 (2022). URL: https://arxiv.org/pdf/2207.12571.pdf.

Song, Kaitao, et al. "MPNet: Masked and Permuted Pre-training for Language Understanding." 34th Conference on Neural Information Processing Systems (NeurIPS 2020), Vancouver, Canada. URL: https://arxiv.org/pdf/2004.09297.pdf.

Sutton, R. S. and Barto, A. G., EM Reinforcement Learning: An Introduction. MIT press, 2018.

Touvron, Hugo, Louis Martin, Kevin Stone, Peter Albert, Amjad Almahairi, Yasmine Babaei, Nikolay Bashlykov, Soumya Batra, Prajjwal Bhargava, Shruti Bhosale, et al. "LLaMA 2: Open foundation and fine-tuned chat models." arXiv preprint arXiv:2307.09288 (2023). URL: https://arxiv.org/pdf/2307.09288.pdfÂ%C2%A0.

Touvron, Hugo, Thibaut Lavril, Gautier Izacard, Xavier Martinet, Marie-Anne Lachaux, Timothée Lacroix, Baptiste Rozière, Naman Goyal, Eric Hambro, Faisal Azhar, et al. "LLaMA: Open and

(56) References Cited

OTHER PUBLICATIONS efficient foundation language models." arXiv preprint arXiv:2302.13971 (2023). URL: https://arxiv.org/pdf/2302.13971.pdf.

Wang, Hao, et al.; "Optimizing federated learning on non-iid data with reinforcement learning." IEEE INFOCOM 2020—IEEE Conference in Computer Communications. IEEE (Year: 2020).

Wang, Nan, et al., "ENORM: A framework for edge node resource management." IEEE transactions on services computing 13.6: 1086-1099. (Year: 2017).

Wang, Yizhong, Yeganeh Kordi, Swaroop Mishra, Alisa Liu, Noah A. Smith, Daniel Khashabi, and Hannaneh Hajishirzi. "SELF-INSTRUCT: Aligning language models with self-generated instructions." arXiv preprint arXiv:2212.10560 (2022). URL: https://arxiv.org/pdf/2212.10560.pdf.

Yang, T., et al., "Applied Federated Learning: Improving Google Keyboard Query Suggestions." arXiv preprint arXiv:1812.02903, https://arxiv.org/pdf/1812.02903.pdf (2018), 9 pages.

\* cited by examiner

EDGE COMPUTING UNITS FOR OPERATING CONVERSATIONAL TOOLS AT LOCAL SITES

CROSS-REFERENCE TO RELATED APPLICATIONS

This application is a continuation of U.S. patent application Ser. No. 18/482,839, filed Oct. 6, 2023, the contents of which are incorporated by reference herein in their entirety.

BACKGROUND

Conversational agents are computer-based dialogue systems that are programmed or configured to converse in language that may be understood by humans. Relying on natural language understanding models or similar techniques, conversational agents enable computer-based systems to communicate with humans using any number of input/output devices, e.g., by displaying written words or causing spoken words to be uttered to humans, by displaying images to humans, or by providing haptic feedback to humans in response to one or more queries received from such humans.

Conversational agents have transformed and even revolutionized techniques by which humans may interact with computer-based systems, or vice versa, and have become more prevalent in many routines of human life. In recent times, conversational agents have established themselves as valuable, automated techniques for providing relevant answers to queries received from users in many fields and settings, including banking, commerce, education, and others. As access to global computer networks has steadily grown over time, and communication speeds and bandwidth over such networks have increased, conversational agents may now potentially reach and provide services to more users in more locations than ever before.

Although most of the world's population now has access to the Internet or other global computer networks, many regions of the planet still lack such access. Unlike computer users in urban or suburban regions, who may commonly choose to access the Internet via multiple broadband or high-speed technologies such as coaxial cable, Digital Subscriber Line (or "DSL"), fiber, or wireless technologies such as "5G," computer users in rural or remote regions that are sparsely populated or where communications infrastructure is unsuitable or problematic frequently do not have such options. Yet because many rural or remote regions are significant contributors to many industries or fields, such as agriculture, energy, tourism, or others, humans within such regions could stand to benefit from enhanced machine learning or artificial intelligence technologies in general, and the use of high-quality conversational agents that rely on such technologies in particular. Currently, providing machine learning or artificial intelligence solutions such as conversational agents to users in arduous or sparsely populated environments, such as those that are limited in power or network connectivity, remains a challenge.

DETAILED DESCRIPTION

The systems and methods of the present disclosure are directed to providing interactive tools for utilizing and upkeeping devices, services or applications via computing units provided at the "edge," or at peripheries of networks, via computing units that are configured for operation in challenging real-world environments. More specifically, the systems and methods of the present disclosure are directed to providing conversational assistive tools that are trained to receive domain-specific queries from users within such environments, or to generate queries based on information or data received from sensors, devices or assets within such environments, and to provide relevant, domain-specific responses to the users in reply to such queries.

In some implementations, the systems and methods of the present disclosure rely on trained machine learning models operating on edge computing units in the form of ruggedized, autonomous systems that may be deployed to harsh environments with limited or unreliable power or network connectivity. The machine learning models may be trained using domain-specific information or data, which may be structured or unstructured in nature, and may be configured to generate reliable responses to data representing queries generated at a local site or in an edge location with minimal latency. Data representing queries may be received directly from users at a local site or edge location, e.g., as entries of text by such users, utterances of words spoken by such users, or images captured by such users. Alternatively, data representing queries may be received from any sensors, devices or assets at the local site or edge location, including but not limited to cameras, microphones, meters, gauges, or any other systems that may be configured to capture information or data regarding events or conditions, and to transmit such information or data to an edge computing unit provided at the local site or edge location.

Figure 1A:
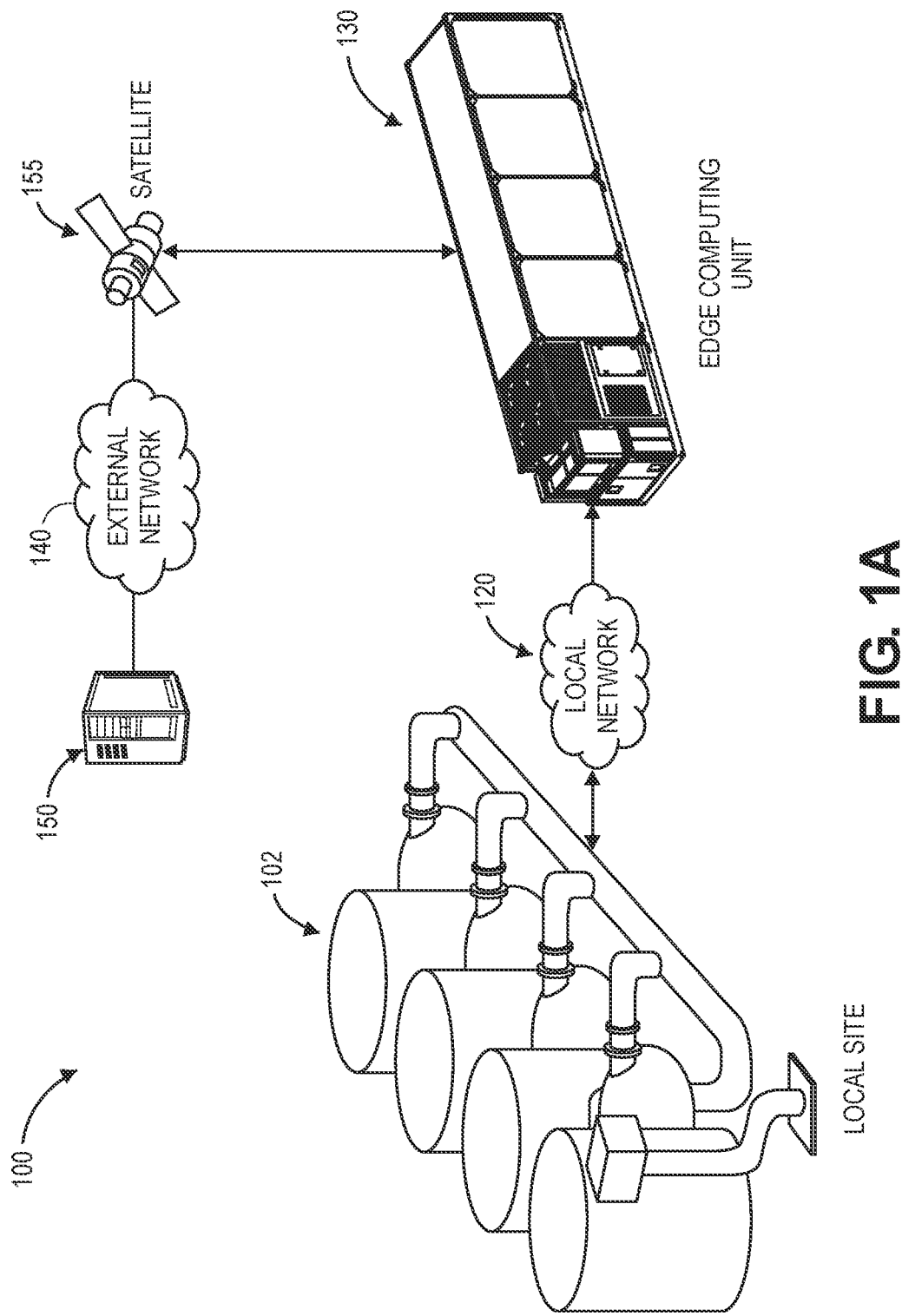
FIGS. 1A through 1K are views of aspects of one system in accordance with embodiments of the present disclosure.

Referring to FIGS. 1A through 1K, views of aspects of one system in accordance with implementations of the present disclosure are shown. As is shown in FIG. 1A, a system 100 includes a local site 102 and an edge computing unit 130 provided in association with the local site 102. The edge computing unit 130 may be in communication with any number of devices or systems at the local site 102 over a local network 120, and also with any number of devices or systems, e.g., an external processing system 150, over an external network 140 that may include the Internet in whole or in part. In particular, as is shown in FIG. 1A, the edge computing unit 130 may access the external network 140 or the external processing system 150 by way of one or more satellites 155, which may provide a backhaul connection with the external network 140.

The local site 102 shown in FIG. 1A includes a desalination plant, e.g., a facility at which salt or other minerals are removed from water. Alternatively, or additionally, the local site 102 may be any other facility or location at which humans may engage in one or more operations, such as an agricultural site (e.g., a farm), an industrial site (e.g., a plant or factory), a tourist attraction (e.g., a remote hotel or park), or any other site. In some implementations, the local site 102 may be a location where power or network connectivity from traditional power grids or other sources, e.g., alternating current ("AC") power in any number of phases and at any frequency or voltage, or direct current ("DC") power at any voltage, are limited or unavailable at one or more times during any given day. Moreover, in some implementations, the local site 102 may include any number of assets, such as systems or components for capturing or sensing information or data, e.g., cameras or other sensors, as well as vehicles of any type or form, which may be manned or unmanned.

The edge computing unit 130 may be a computer system that includes any number of servers, processors, data stores, transceivers, switches, or other computer components or systems, as well as any number of power units, environmental control systems, isolation systems, or systems. Power units of the edge computing unit 130 may include any number of batteries, diesel engines, solar panels, or other power sources. Environmental control systems of the edge computing unit 130 may include any number of heating units, air conditioning units, fans, dampers, valves, humidifiers, dehumidifiers, or other systems for controlling environmental conditions within or around the edge computing unit 130. Isolation systems of the edge computing unit 130 may include any number of components for isolating internal portions of the edge computing unit 130 from an external environment at the local site 102, and may form or define chambers having any number of covers, sides, bottoms, doors, or other components formed from any suitable materials. Alternatively, or additionally, the edge computing unit 130 may include any number of other components or systems.

Components of the edge computing unit 130 may be provided in a housing, such as a containerized unit, that is configured to maintain such components at desired temperatures, pressures, humidity levels or others, while protecting such components against the elements or any other adverse conditions at the local site 102. The edge computing unit 130 may have been transported to the local site 102 by one or more external propulsion units, e.g., aircraft, road tractors, trailers or trains, and may include one or more motors or other systems for reorienting or repositioning itself at the local site 102.

The local network 120 may include any number of networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols. For example, in some implementations, the local network 120 may include any number of access points, switches, routers or other components that may be configured to enable the exchange of information or data between one or more sensors, devices or other assets provided at the local site 102 and the edge computing unit 130 over any number of systems or protocols.

The external network 140 may be any wired network, wireless network, or combination thereof, and may comprise the Internet in whole or in part. In addition, the external network 140 may be a personal area network, local area network, wide area network, cable network, satellite network, cellular telephone network, or combination thereof. The external network 140 may also be a publicly accessible network of linked networks, possibly operated by various distinct parties, such as the Internet. In some embodiments, the external network 140 may be a private or semi-private network, such as a corporate or university intranet. The external network 140 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and need not be described in more detail herein.

Any combination of networks or communications protocols may be utilized by the local network 120 or the external network 140 in accordance with the systems and methods of the present disclosure. For example, devices or systems connected to the local network 120 or the external network 140 described herein may be configured to communicate via an open or standard protocol such as Wi-Fi. Alternatively, devices or systems connected to the local network 120 or the external network 140 may be configured to communicate with one another directly outside of a centralized network, e.g., by a wireless protocol such as Bluetooth, in which two or more of such components may be paired with one another.

The external processing system 150 may include any number of physical computer servers having one or more computer processors and any number of data stores (e.g., databases) associated therewith, as well as provided for any specific or general purpose. For example, the external processing system 150 may be independently provided for the exclusive purpose of receiving, analyzing or storing information or data received from the edge computing unit 130 or, alternatively, provided in connection with one or more physical or virtual services that are configured to receive, analyze or store such information or data, as well as to perform one or more other functions. In some implementations, the external processing system 150 may be provided in a physical location. In other such implementations, the external processing system 150 may be provided in one or more alternate or virtual locations, e.g., in a "cloud"-based environment.

The satellite 155 may be any system that is configured to relay signals containing information or data between two or more computer devices or systems while orbiting the Earth. For example, the satellite 155 may be a portion of a propagation path of a communication link between two or more computer devices or systems that orbits the Earth. Alternatively, or additionally, the satellite 155 may be any other airborne or spaceborne device or system, e.g., an airliner, a drone, or a balloon, that may but need not travel in outer space or orbit the Earth to relay signals between the edge computing unit 130 and the external network 140 or the external processing system 150.

Although only a single satellite 155 is shown in FIG. 1A, the edge computing unit 130 may be configured to communicate with the external network 140, or any external processing systems 150, by way of any number of satellites 155. Moreover, in some implementations, the edge computing unit 130 may be configured to communicate with the external network 140 by the transmission or receipt of data by any other means or techniques other than the satellite 155.

Figure 1B:
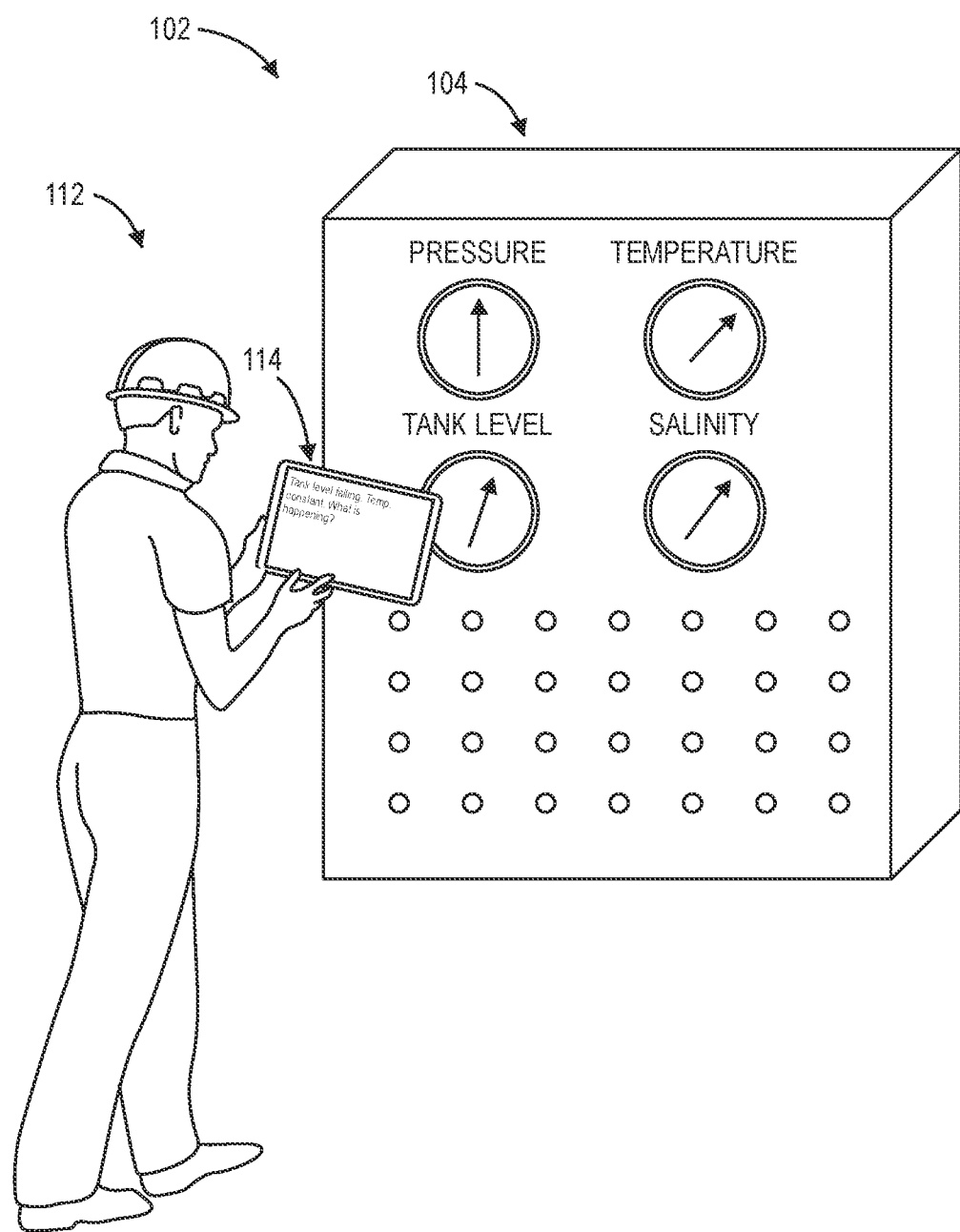

As is shown in FIG. 1B, a worker 112 (e.g., an agent, a contractor, an employee, an inspector, or another person) at the local site 102 reads a panel 104 (or another system) having a set of gauges, meters, or other indicators of conditions of one or more aspects of the desalination plant at the local site 102. For example, as is shown in FIG. 1B, the panel 104 includes gauges, meters or other indicators of pressures, temperatures, tank levels or salinities at various points within the desalination plant. The worker 112 further operates a mobile device 114 (e.g., a tablet computer), which may be connected to the edge computing unit 130 of FIG. 1A via the local network 120 of FIG. 1A, to enter information or data regarding such conditions, or any other information or data. For example, the worker 112 may enter the information or data to the mobile device 114 by typing one or more letters, characters or symbols via a physical or virtual keyboard, or by uttering one or more words or phrases that are captured by microphones or other acoustic sensors of the mobile device 114. Alternatively, or additionally, the worker 112 may enter the information or data in any other manner.

Figure 1C:
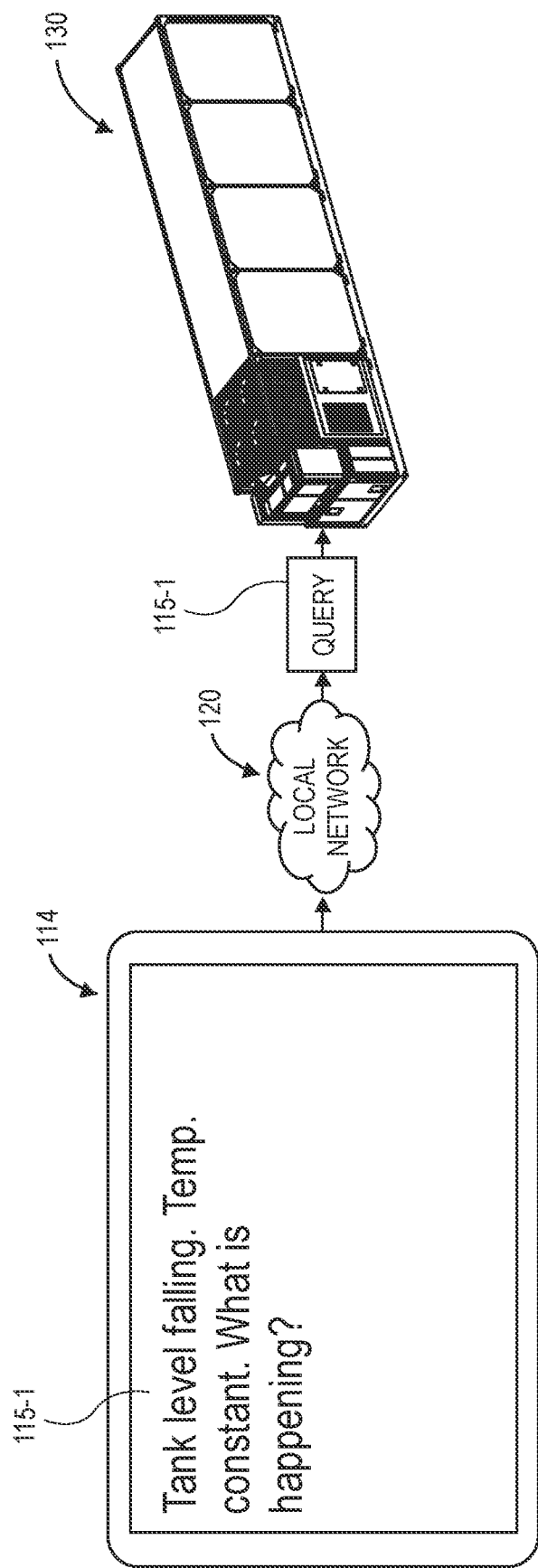

As is shown in FIG. 1C, the worker 112 enters data representing a query 115-1, viz., a set of text including "Tank level falling. Temp. constant. What is happening?" via the mobile device 114. The query 115-1 is transmitted by the mobile device 114 to the edge computing unit 130 over the local network 120. Alternatively, or additionally, one or more other sensors, devices or assets at the local site 102 may be configured to generate and transmit information or data regarding conditions or operations at the local site 102 to the edge computing unit over the local network 120, and such information or data may be processed along with data entered by the worker 112, or separately, to generate the query 115-1 therefrom.

Figure 1D:
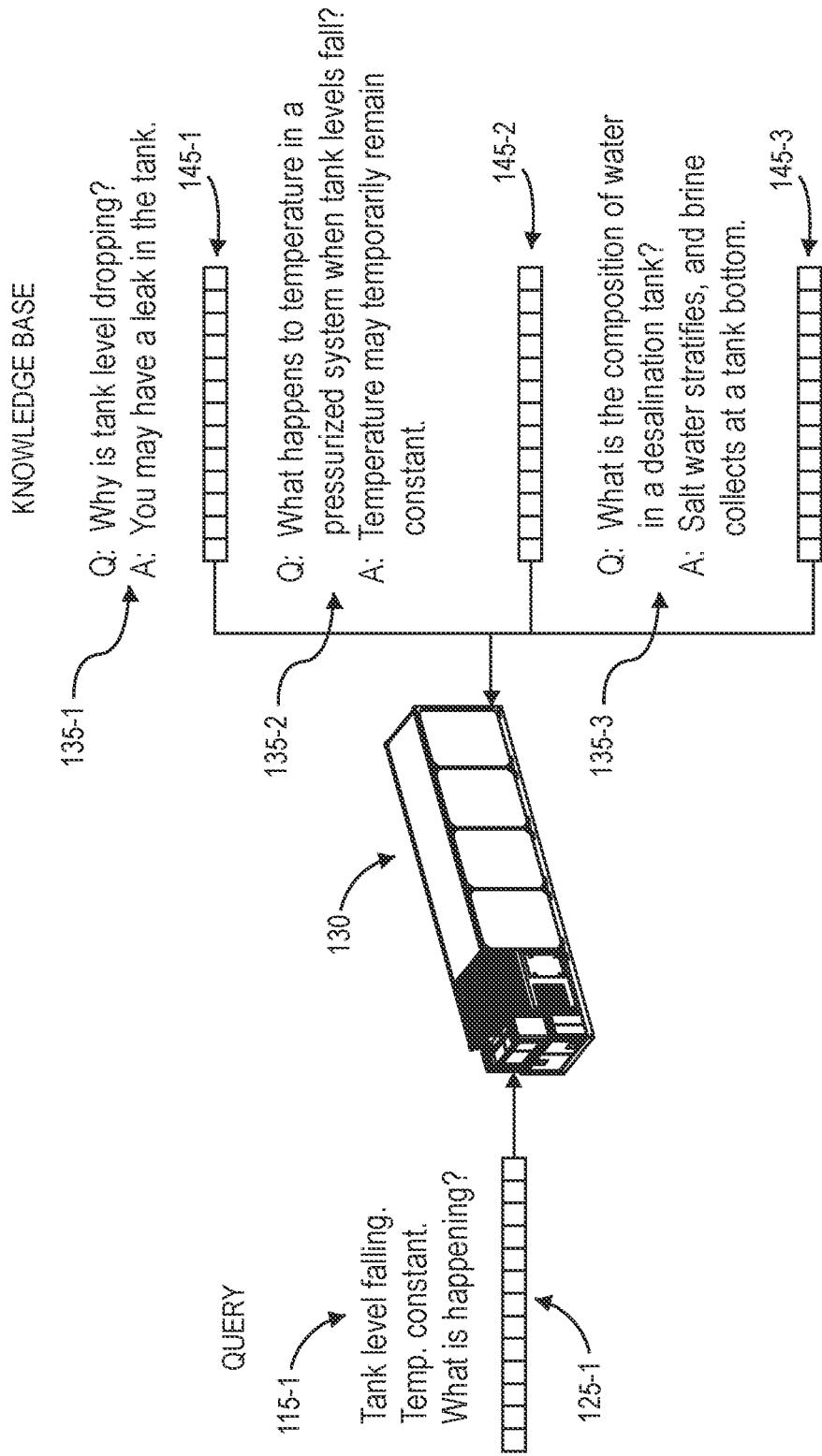

In accordance with implementations of the present disclosure, edge computing apparatuses, such as the edge computing unit 130, may be configured to execute one or more conversational tools (or agents or techniques) to generate responses to humans in reply to queries received from such humans. For example, as is shown in FIG. 1D, upon receiving the query 115-1 from the mobile device 114 of the worker 112, the edge computing unit 130 generates an embedding 125-1 (e.g., a query embedding), or a vector or set of values that are semantic descriptors of the query 115-1, e.g., by a model such as a transformer having one or more encoders or decoders. The edge computing unit 130 may then compare the embedding 125-1 to embeddings generated from information or data of a knowledge base regarding operations, tasks or functions of the worker 112, or otherwise relating to the local site 102. For example, in some implementations, the knowledge base may include any number of knowledge documents, such as pairs of questions and answers to such questions, which may be obtained from any source, and may be filtered, limited or otherwise defined to include only such knowledge documents relating to a domain of the worker 112, the local site 102, or operations at the local site 102 (e.g., the desalination plant). The domain may relate to any discipline, field, industry, realm, specialty, subject, topic, or other grouping of information or data regarding operations at the local site 102. For example, the domain may be specific to certain connectivity, equipment, machinery, natural resources, personnel, power availability, weather, or other aspects of the local site 102.

The knowledge documents may have been provided as inputs to the same model that generated the embedding 125-1 from the query 115-1, or a different model, and embeddings may be generated for each of such knowledge documents. Alternatively, or additionally, a knowledge base may include any other type or form of knowledge documents, in addition to pairs of questions and answers, or need not include any pairs of questions of answers. Embeddings, or "knowledge embeddings," generated from knowledge documents such as pairs of questions and answers may be stored in association with the documents from which the embeddings were generated in one or more data stores provided on the edge computing unit 130.

As is further shown in FIG. 1D, the edge computing unit 130 may identify a predetermined number of embeddings 145-1, 145-2, 145-3 of the knowledge base (e.g., knowledge embeddings, or, alternatively, knowledge base embeddings or domain embeddings) that are nearest or most similar to the embedding 125-1 generated based on the query 115-1. Nearness or similarity of embeddings may be determined in any manner, such as based on Euclidean distances between such embeddings, cosine similarity or dot product similarity of such embeddings, or in any other manner. The predetermined number of the embeddings 145-1, 145-2, 145-3, viz., three, may be selected on any basis, such as any criteria or limitations of a conversational tool or model with which the embeddings are to be utilized. Alternatively, or additionally, a distance threshold or limit may be applied to embeddings of the knowledge base, such that only embeddings that are within a predetermined threshold distance or similarity are selected based on the embedding 125-1, even if fewer than the predetermined number of the embeddings satisfy the distance threshold or limit.

Once a set of nearest embeddings of the knowledge base have been identified, viz., the embeddings 145-1, 145-2, 145-3, pairs of questions and answers that were used to generate such embeddings are identified. For example, as is shown in FIG. 1D, a pair 135-1 of a question "Why is tank level dropping?" and an answer "You may have a leak in the tank," that were provided to a model in order to generate the embedding 145-1 are identified upon determining that the embedding 145-1 is one of the embeddings of the knowledge base that is nearest or most similar to the embedding 125-1. Similarly, a pair 135-2 of a question "What happens to temperature in a pressurized system when tank levels fall?" and an answer "Temperature may temporarily remain constant," and a pair 135-3 of a question "What is the composition of water in a desalination tank?" and an answer "Salt water stratifies and brine collects at a tank bottom," that were provided to a model in order to generate the embeddings 145-2, 145-3 are identified upon determining that the embeddings 145-2, 145-3 are nearest or most similar to the embedding 125-1.

Figure 1E:
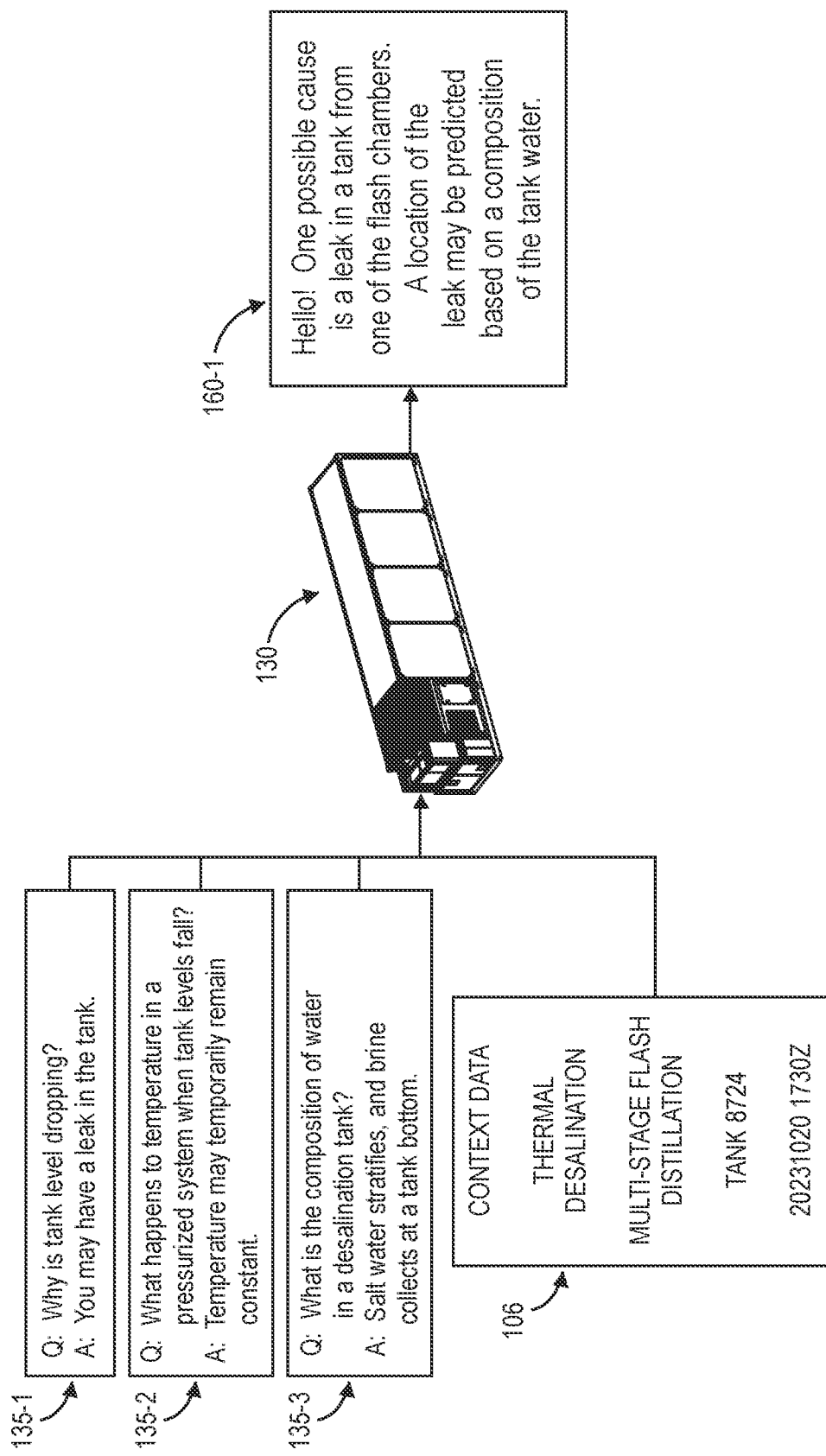

In accordance with implementations of the present disclosure, edge computing units at local sites or edge locations may identify or generate responses to queries received from humans using conversational tools based on knowledge documents, such as pairs of questions of answers, as well as contextual data or any other instructions. As is shown in FIG. 1E, the edge computing unit 130 provides the three pairs 135-1, 135-2, 135-3 of questions and answers identified based on the query 115-1 and the embedding 125-1 and a set of context data 106 as inputs to a conversational tool executed by the edge computing unit 130. The set of context data 106 may identify one or more attributes or features of the desalination plant, e.g., that the desalination plant operates by thermal desalination, such as by multi-stage flash distillation, and may include identifiers of components of the desalination plant (e.g., a tank number), or times or dates at which the query 115-1 was received from the worker 112. Alternatively, or additionally, the edge computing unit 130 may further provide any information or data captured by one or more other sensors, devices or assets at the local site 102 as inputs to the conversational tool.

As is further shown in FIG. 1E, the edge computing unit 130 generates a response 160-1 to the query 115-1 based on outputs received from the conversational tool in response to the pairs 135-1, 135-2, 135-3 and the contextual data 106. In particular, the response 160-1 states, "Hello! One possible cause is a leak in a tank from one of the flash chambers. A possible location of the leak may be predicted based on the composition of the tank water."

Figure 1F:
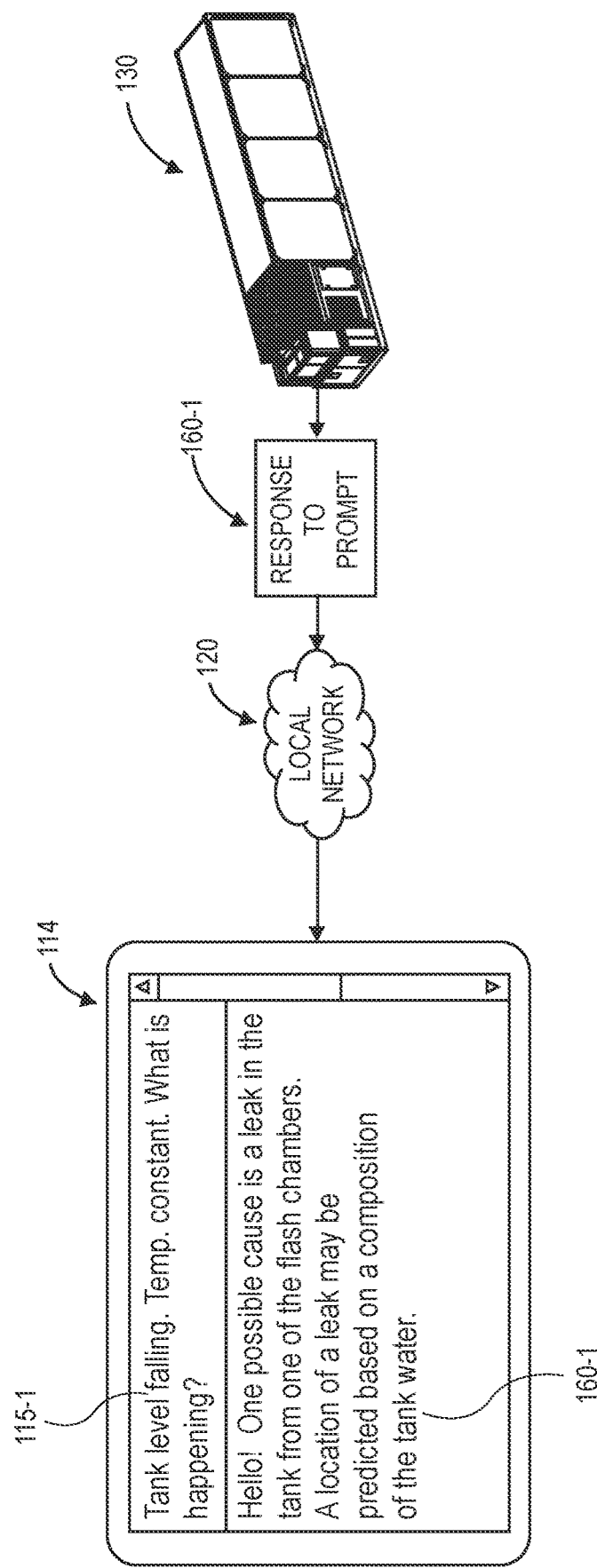

As is shown in FIG. 1F, the response 160-1 is transmitted to the mobile device 114 of the worker 112 over the local network 120. The mobile device 114 displays the response 160-1 to the query 115-1 in line with the query 115-1, e.g., in a user interface or window that may be scrolled or translated across a display of the mobile device 114. The response 160-1 is thus provided in a conversational manner, e.g., as a reply to the query 115-1 posed by the worker 112. Alternatively, in some implementations, the response 160-1 may be an initial communication between the edge computing unit 130 and the worker 112, such as where the response 160-1 is generated based on information or data received from any sensors, devices or assets at the local site 102 by the edge computing unit 130 over the local network 120.

Figure 1G:
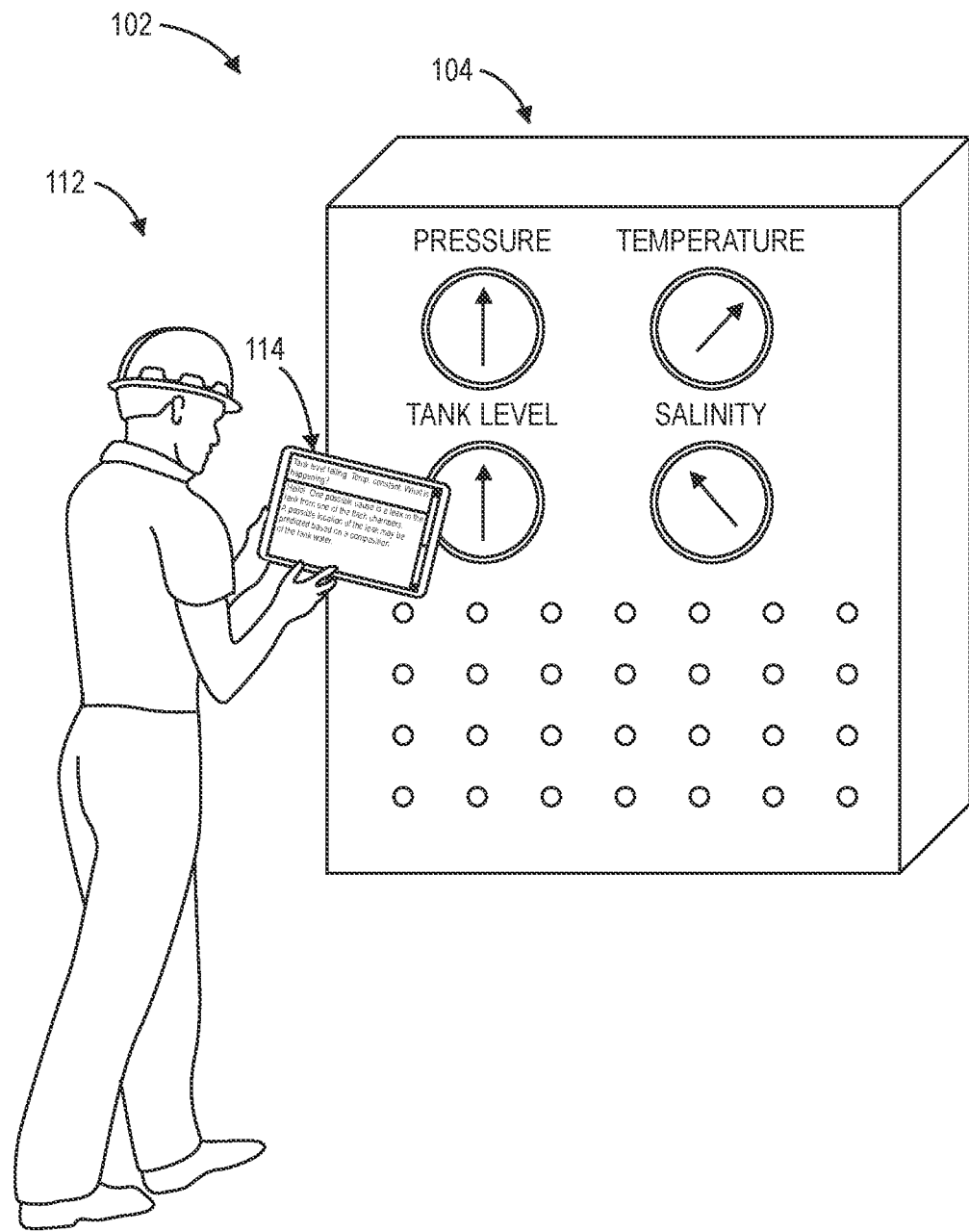

As is shown in FIG. 1G, the worker 112 further evaluates the panel 104 and determines updated conditions of the one or more aspects of the desalination plant at the local site 102 by reading the gauges, meters or other indicators provided thereon. For example, as is shown in FIG. 1G, the panel 104 indicates that both tank levels and salinity have decreased as compared to their readings shown in FIG. 1B, with salinity decreasing to a greater extent than tank levels with respect to their readings shown in FIG. 1B.

Figure 1H:
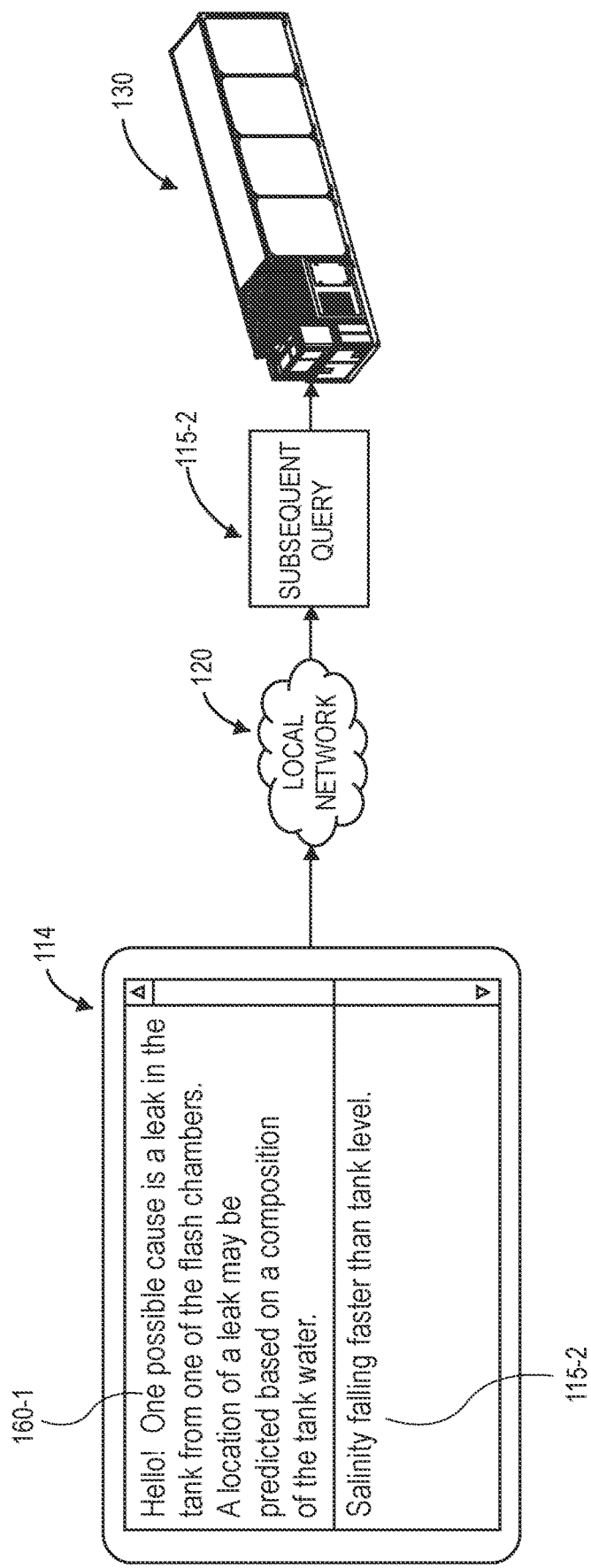

As is shown in FIG. 1H, the mobile device 114 transmits data representing a subsequent query 115-2 received from the worker 112, viz., a set of text including "Salinity falling faster than tank level," to the edge computing unit 130 via the local network 120. The query 115-2 is transmitted over the local network 120 to the edge computing unit 130.

Figure 1I:
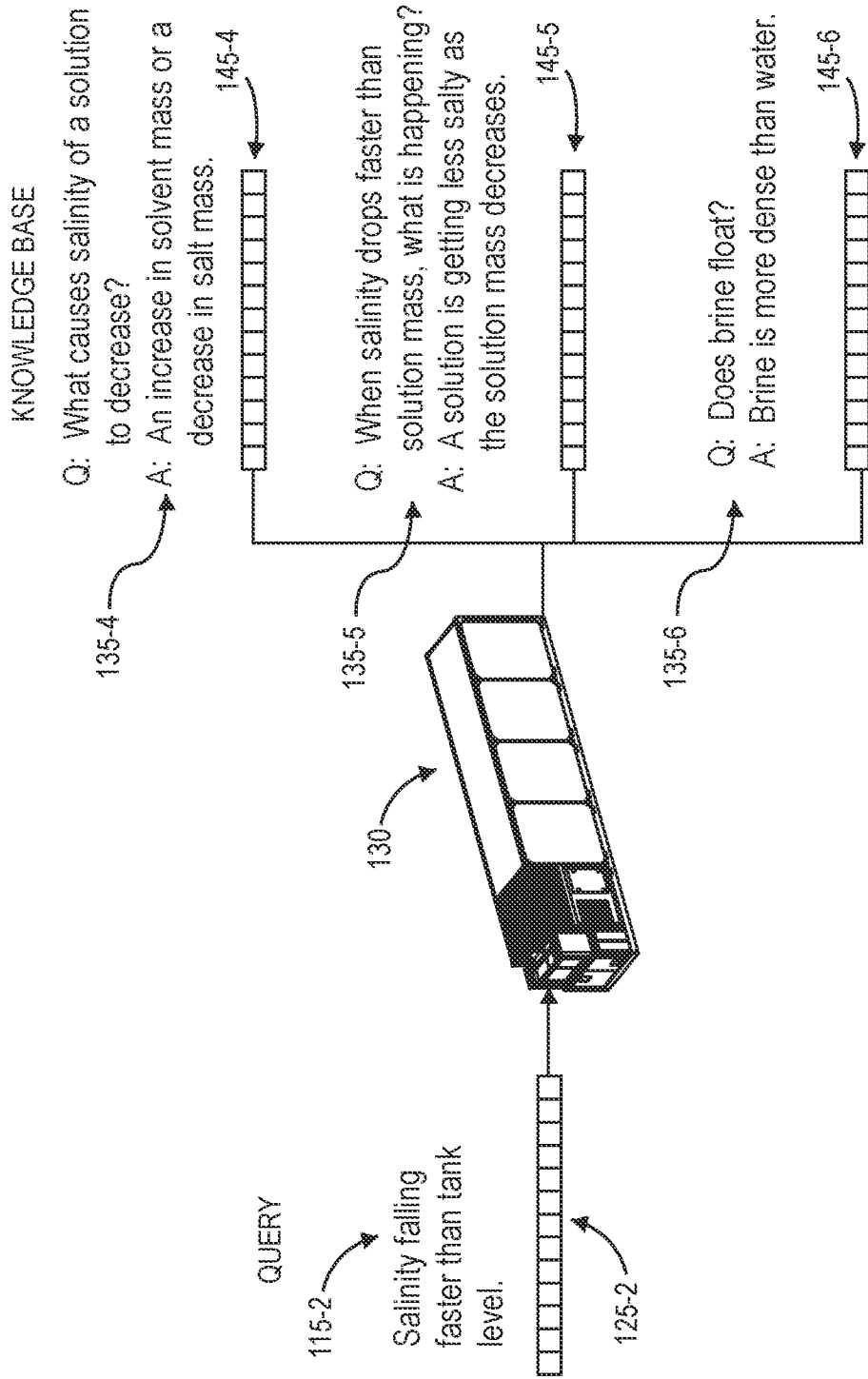

As is shown in FIG. 1I, upon receiving the query 115-2 from the mobile device 114 of the worker 112, the edge computing unit 130 generates an embedding 125-2 (e.g., a query embedding), or a vector or set of values that are semantic descriptors of the query 115-2, e.g., by the same model that was used to generate the embedding 125-1 shown in FIG. 1D. The edge computing unit 130 may then compare the embedding 125-2 to the embeddings generated from the knowledge base regarding operations, tasks or functions of the worker 112, or otherwise relating to the local site 102. As is further shown in FIG. 1I, the edge computing unit 130 may identify a predetermined number of embeddings 145-4, 145-5, 145-6 of the knowledge base (e.g., knowledge embeddings, knowledge base embeddings or domain embeddings) that are nearest or most similar to the embedding 125-2 generated based on the query 115-2.

Once a set of nearest embeddings of the knowledge base have been identified, viz., the embeddings 145-4, 145-5, 145-6, pairs of questions and answers that were used to generate such embeddings are determined. For example, as is shown in FIG. 1I, a pair 135-4 of a question "What causes salinity of a solution to decrease?" and an answer "An increase in solvent mass or a decrease in salt mass," that were provided to a model in order to generate the embedding 145-4 are identified upon determining that the embedding 145-4 is one of the embeddings of the knowledge base that is nearest or most similar to the embedding 125-2. Similarly, a pair 135-5 of a question "When salinity drops faster than solution mass, what is happening?" and an answer "A solution is getting less salty as the solution mass decreases," and a pair 135-6 of a question "Does brine float?" and an answer "Brine is more dense than water," that were provided to a model in order to generate the embeddings 145-5, 145-6 are identified upon determining that the embeddings 145-5, 145-6 are nearest or most similar to the embedding 125-2.

Figure 1J:
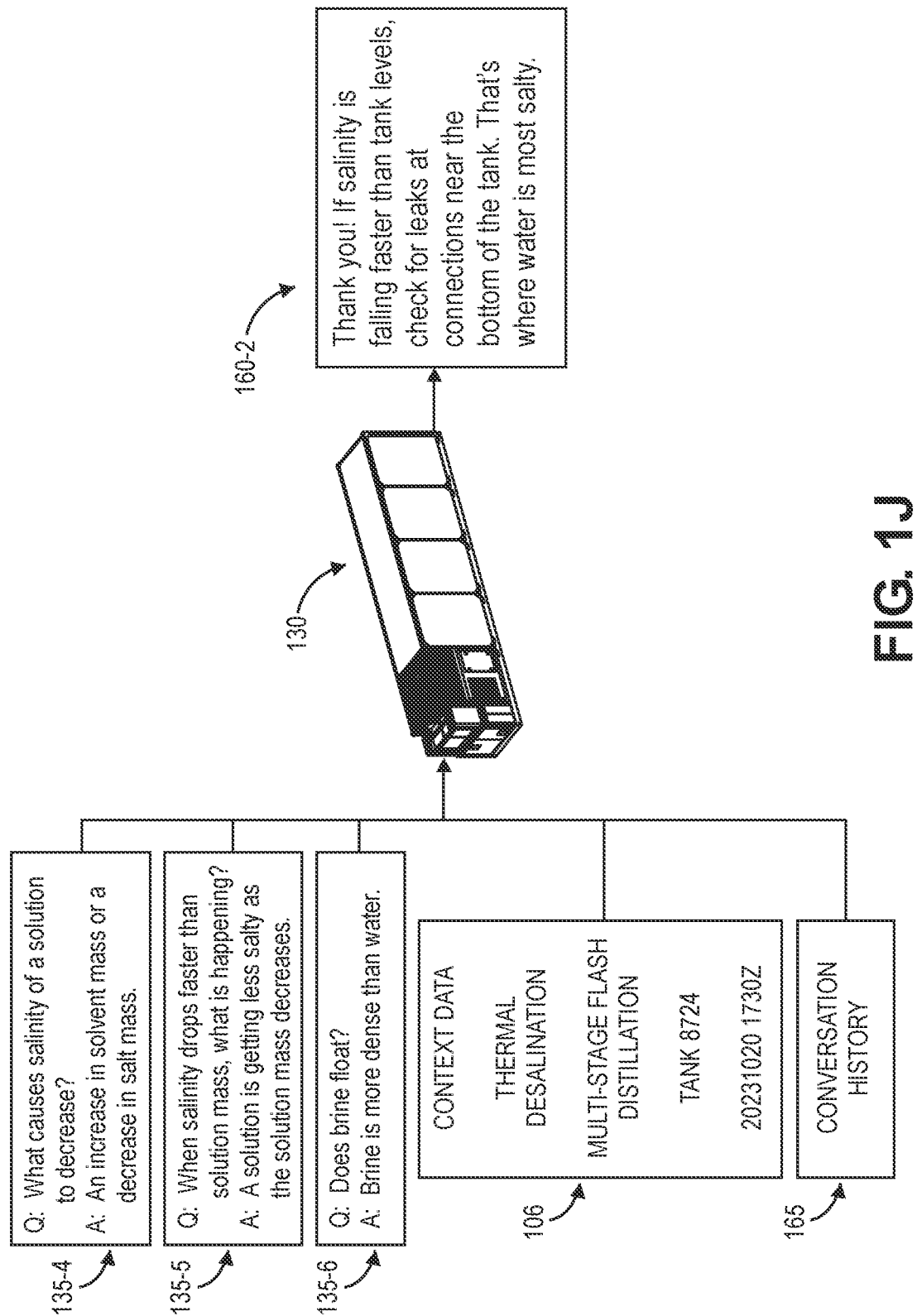

In accordance with implementations of the present disclosure, conversational tools executed by edge computing units may consider not only queries received from users, sensors, devices or assets as well as and contextual data but also a conversational history including queries previously received and responses provided in reply to such queries when generating responses to queries that are subsequently received. As is shown in FIG. 1J, the edge computing unit 130 provides the three pairs 135-4, 135-5, 135-6 of questions and answers identified based on the query 115-2 and the embedding 125-2, the set of context data 106, and also a conversation history 165 as inputs to the conversational tool executed by the edge computing unit 130. The conversation history 165 may include the query 115-1 and the response 160-1, or any other queries received from the worker 112 or responses provided to the worker 112. Alternatively, or additionally, the edge computing unit 130 may further provide any information or data captured by one or more other sensors, devices or assets at the local site 102 as inputs to the conversational tool.

As is further shown in FIG. 1J, the edge computing unit 130 generates a response 160-2 based on the three pairs 135-4, 135-5, 135-6, the set of context data 106, and the conversation history 165, viz., "Thank you! If salinity is falling faster than tank levels, check for leaks at connections near the bottom of the tank. That's where the water is most salty." The edge computing unit 130 may then transmit the response 160-2 to the mobile device 114 of the worker 112 over the local network 120.

Figure 1K:
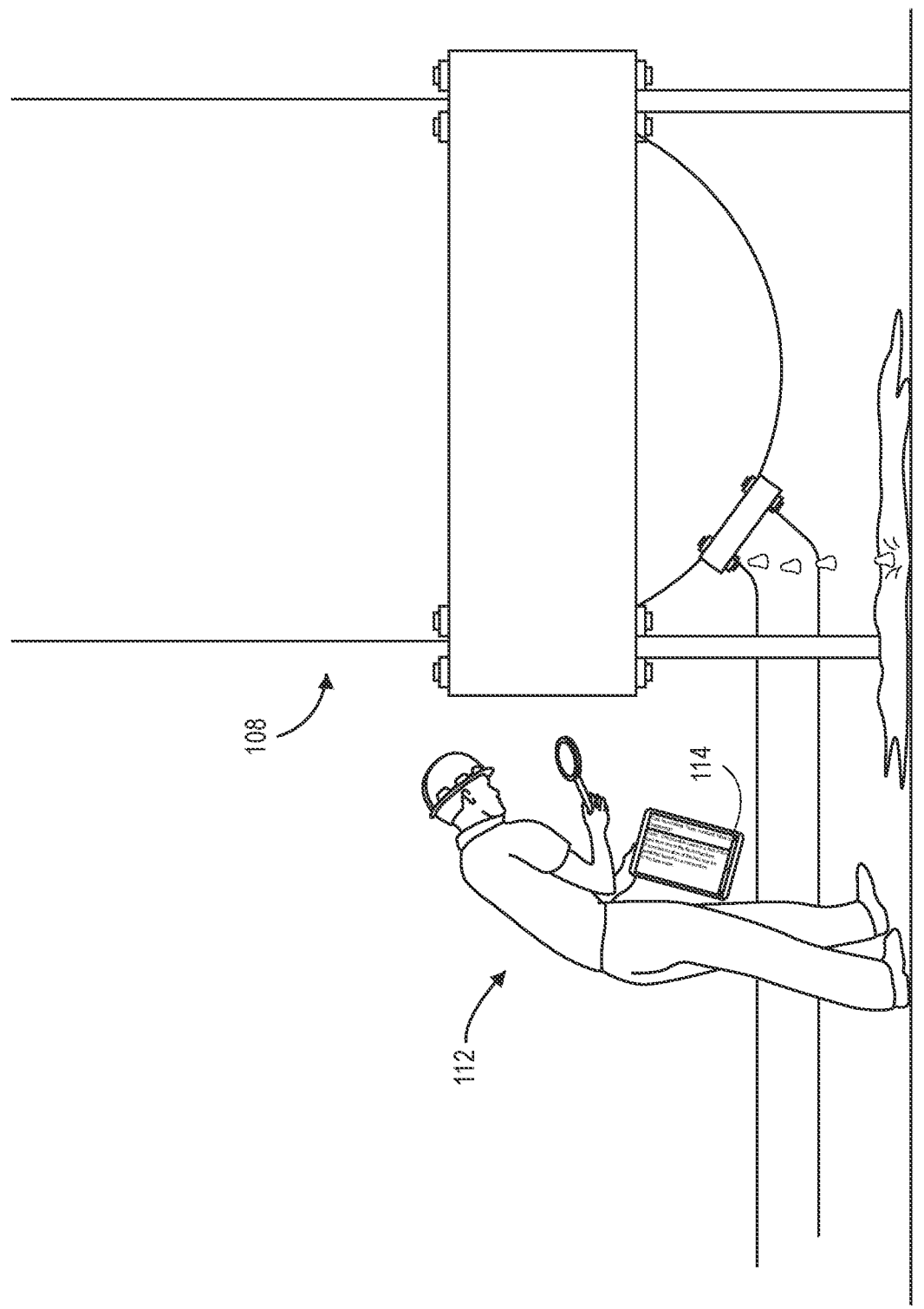

As is shown in FIG. 1K, upon receiving the response 160-2 by way of the mobile device 114, the worker 112 evaluates a portion of a tank 108 in a manner consistent with the response 160-2. In particular, the worker 112 inspects a connection with a pipe at a lower portion of the tank 108, using a magnifying glass or another visual instrument, and detects a leak from the pipe, consistent with information provided in the response 160-2. The worker 112 may then take actions or request assistance regarding the leak, e.g., by operating one or more valves or other systems of the tank 108, as necessary, or cleaning up water that leaked from the tank 108.

Subsequently, the edge computing unit 130 may be further trained or modified based on the conversation with the worker 112. For example, a knowledge base may be updated to include the queries 115-1, 115-2 and the responses 160-1, 160-2 thereto, or any other queries and responses. Knowledge embeddings may be generated based on the queries 115-1, 115-2 and the responses 160-1, 160-2, such as by providing the queries 115-1, 115-2 and the responses 160-1, 160-2 to one or more embedding models, and the queries 115-1, 115-2 and the responses 160-1, 160-2 may be stored in association with the knowledge embeddings generated therefrom in one or more data stores of the edge computing unit 130. Additionally, to the extent that the edge computing unit 130 provided relevant and accurate information to the worker 112, a conversational tool operating thereon may be further trained or fine-tuned based on the queries 115-1, 115-2 and the responses 160-1, 160-2.

Accordingly, the systems and methods of the present disclosure may be used to provide conversational tools to address queries regarding operations at local sites or edge locations. The conversational tools of the present disclosure may be operated or executed by edge computing units (or edge computing apparatuses) operating at such sites or in such locations, and may rely on comprehensive, domain-specific knowledge bases to generate responses to queries received directly from humans or generated based on information or data captured by one or more sensors, devices or assets, and to guide such humans through conflict identification and resolution. The conversational tools of the present disclosure empower humans to articulate matters of concern naturally, e.g., in domain-specific language, and may be relied upon to provide instantaneous guidance to such humans in real time or near-real time, even where edge computing units are provided at local sites or in edge locations where the availability of power or network connectivity is limited or non-existent.

Edge computing units of the present disclosure may play valuable roles in providing relevant machine learning and artificial intelligence resources to challenging environments, specifically with regard to applications that require processing in real time or near-real time, with high reliability and minimal latency. An edge computing unit executing such applications may process data received from high-bandwidth sensors or systems, including but not limited to cameras, light detection and ranging (or "LiDAR") or time-of-flight sensors, accelerometers, fiber-optic sensors, radar or ultrasonic sensors, which may stream data at increasingly high rates. Where such sensors are provided in remote locations with sporadic or limited connectivity, analyzing data captured by such sensors in situ may be more feasible rather than transmitting such data to one or more remote systems operating in the "cloud." Depending on numbers of sensors or systems that are operated to capture such data, much of the data will remain unanalyzed or unutilized.

Edge computing units of the present disclosure may have any size or shape, and take any form. In some implementations, edge computing units may be provided in standardized containers, thereby enabling such units to be rapidly transported to any locations by a single mode or in an intermodal fashion, e.g., by air, sea or land, and positioned in place using standard equipment such as cranes, forklifts, or other machinery. The edge computing units may contain or have ready access to critical infrastructure such as power, climate control systems, security features, fire protection systems or access control systems. The edge computing units may also include integrated hardware components and software applications programmed thereon prior to deployment, such that the edge computing units may be activated and placed into service following installation without delay.

Edge computing units of the present disclosure may further include sufficient power for sustaining operations of such units, and ensuring redundancy even during downtime such as maintenance, updating or repairs. The edge computing units may operate based on alternating current ("AC") electrical power, direct current ("DC") electrical power, or power from any other source. In some implementations, the edge computing units may operate on 480 volt, three-phase, 60 Hertz AC power. In some other implementations, the edge computing units may be configured for operation on 220 to 230 volt, single-phase AC power at any frequency. Alternatively, the edge computing units may operate using AC power or DC power at any voltage, power level or frequency.

Edge computing units of the present disclosure may also include any number of servers or other computer devices or systems, as may be required in order to execute any desired applications or perform any desired functions. In some implementations, the edge computing units may include server racks that are isolated or otherwise configured for resistance against shocks or vibrations during transportation or operations.

Edge computing units may be operated independently or as members of groups (e.g., a fleet of such units), and may communicate over local networks at local sites where the edge computing units are employed, e.g., via short-range wired or wireless networks, or over backhaul links to the Internet or other computer networks via wired, wireless or satellite connections. The edge computing units may be programmed with software applications for overseeing operations at a local site, as well as power, data transmission and connectivity of the edge computing units, for simplifying the deployment and management of applications with asset-aware resource provisioning, for managing workloads deployed to edge computing units or other assets at local sites with automatic resource provisioning, job assignment or cancellation features, and for maintaining security and access controls for the edge computing units and other assets.

Figure 2A:
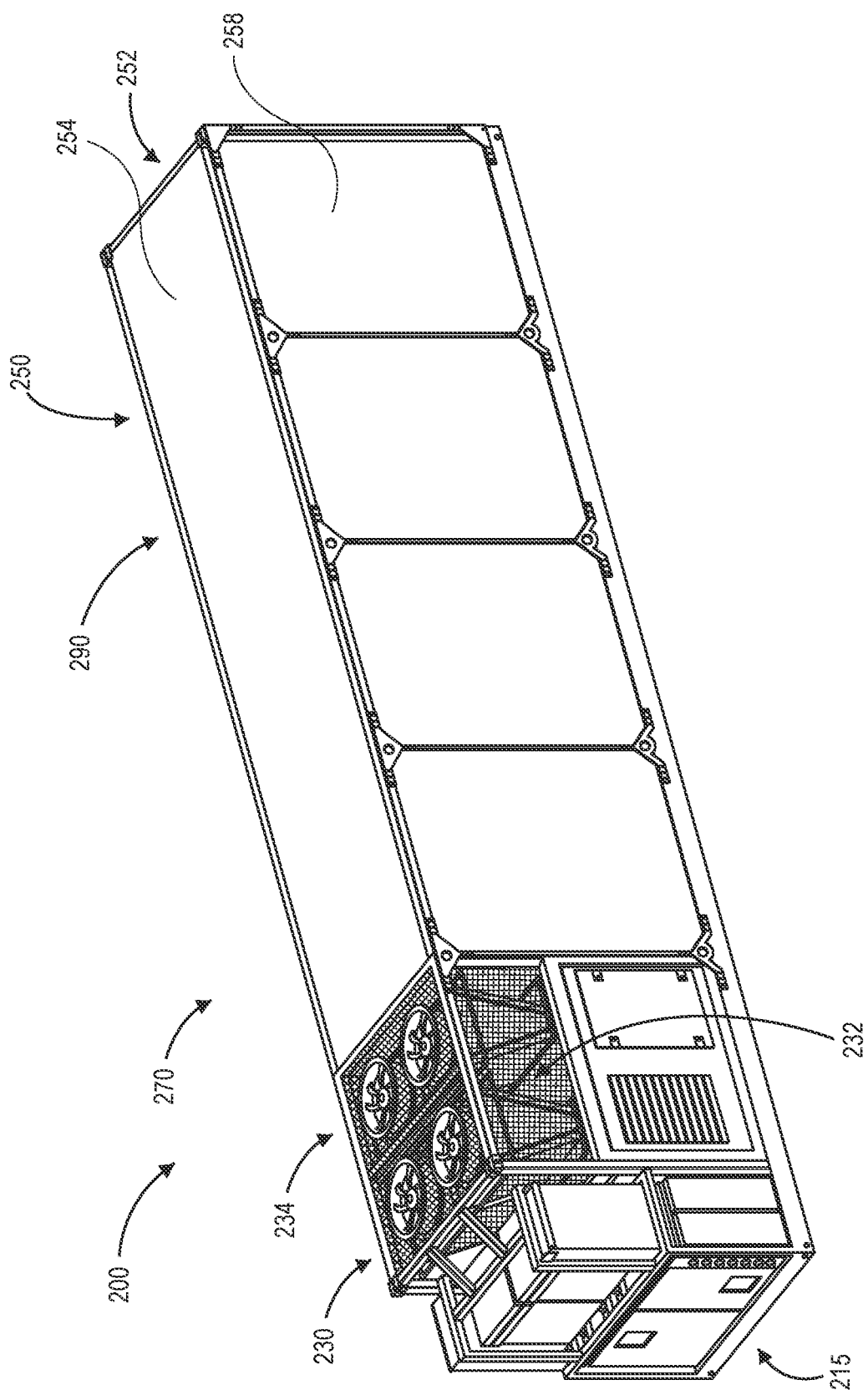
FIGS. 2A and 2B are views of aspects of an edge computing apparatus in accordance with embodiments of the present disclosure.
Figure 2B:
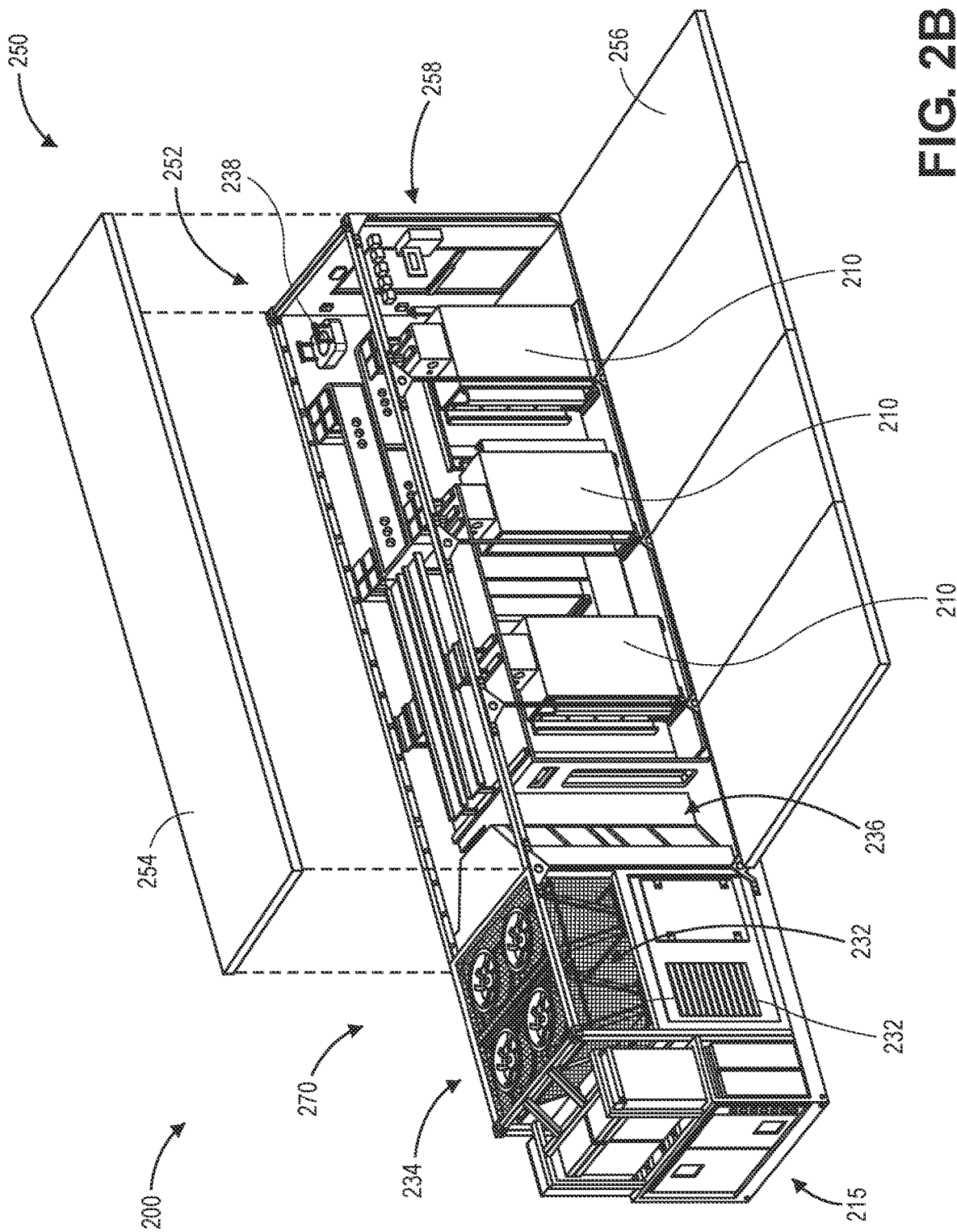

Edge computing units of the present disclosure may have any size, shape or dimensions, and may include any number of components or systems. Referring to FIGS. 2A and 2B, an edge computing apparatus 200 of the present disclosure is shown. As is shown in FIGS. 2A and 2B, the edge computing apparatus 200 comprises a plurality of server racks 210, a plurality of power units 215, a plurality of environmental control systems 230 and an isolation system 250 disposed in a housing 270 having a form of a containerized unit 290. The edge computing apparatus 200 may be deployed to particular sites or locations, which may be referred to herein as "local sites" or "edge locations," using one or more external propulsion units such as helicopters, road tractors, ships, trailers, trains, or others, which may be configured to lift, carry or otherwise transport the edge computing apparatus 200 to such locations, e.g., over substantially long distances. Alternatively, the edge computing apparatus 200 may further include propulsion units that are integrated with the edge computing apparatus 200, such as motors, engines, drive train components, transmissions, axles, wheels or other features. For example, in some implementations, the edge computing apparatus 200 may be an integral component of a road tractor, a trailer or a train. In some implementations, the edge computing apparatus 200 may further include one or more internal propulsion systems, e.g., electrical motors, which may be used to subsequently move or relocate the edge computing apparatus 200 for short distances upon an arrival at a local site or an edge location.

The server racks 210 may include any number of computing components, units or systems. For example, in some implementations, each of the server racks may include one or more central processing units, as well as data stores or other memory components, networking systems, power supplies, high-performance computing units, e.g., graphical processing units, field programmable gate arrays, vision processing units, associative processing units, tensor processing units, neuromorphic chips, quantum processing units, or the like. Numbers of the respective processor units or other components within each of the server racks 210 may be selected for redundancy or for resiliency, or on any other basis. Moreover, the networking systems may include one or more routers, networking switches, out-of-band switches, or systems for communication between the respective server racks 210 or any number of components of the edge computing apparatus 200 within the housing 270, or for communication with any number of external systems (not shown).

The edge computing apparatus 200 may further include one or more power units 215, which may include any number of components for generating or storing energy in any form. For example, in some implementations, the power units 215 may include any number of batteries or other power cells, e.g., dry cell or wet cell batteries such as lead-acid batteries, lithium-ion batteries, nickel cadmium batteries or nickel metal hydride batteries, or any other type, size or form of batteries. In some implementations, the power units 215 may further include one or more diesel engines, electric engines, or engines or motors that are powered by any other source of energy, e.g., gasoline, natural gas, fuel cells, nuclear reactors, solar power, or others. The power units 215 of the edge computing apparatus 200 may be selected on any basis, such as their respective peak or mean voltages, peak or mean load currents, charge times, fuel capacities, or other attributes.

In some implementations, the power units 215 may be coupled to one or more solar panel arrays that are included in, coupled to, or otherwise associated with surfaces of the edge computing unit 200. For example, solar panel arrays may be attached to a top surface of the housing 270, or in any other portion of the housing 270. The solar panel arrays may be fixed in position, or foldable, collapsible, or otherwise movable between deployed and stowed positions, and exposed in order to generate electrical power using sunlight incident upon surfaces of the solar panel arrays. Electrical power generated by solar panel arrays may be transferred to the power units 215 and used to power the edge computing unit 200 and its constituent components.

The edge computing apparatus 200 may further include one or more environmental control systems 230 in order to maintain or establish a desired set of environmental conditions (e.g., temperature, pressure, humidity, or others) within the edge computing apparatus 200. For example, the environmental control systems 230 may include, but need not be limited to, one or more air conditioning units 232, fans 234, dampers 236 and heaters 238. The air conditioning units 232 may be formed from metals, plastics or other suitable materials and include any number of compressors, condensers, evaporators or other systems for maintaining or reducing air temperatures within the edge computing apparatus 200. The environmental control systems 230 may include any number of fans 234 for initiating air flows into the air conditioning units 232 or throughout the housing 270. The environmental control systems 230 may also include one or more dampers 236 for initiating, isolating or regulating flows of air into, throughout or out of the edge computing apparatus 200. The environmental control systems 230 may further include one or more heaters 238 of any type or form, e.g., electric, gas, kerosene, propane, or others, which may include any number of systems for maintaining or increasing air temperatures within the edge computing apparatus 200.

The environmental control systems 230 shown in FIGS. 2A and 2B are integral to the edge computing apparatus 200. Alternatively, or additionally, the edge computing system 200 may include any number of other environmental control systems (not shown) that operate in a standalone manner, external to the edge computing apparatus 200, in order to maintain or establish a desired set of environmental conditions within the edge computing apparatus 200.

As is shown in FIGS. 2A and 2B, the edge computing apparatus 200 may further include an isolation system 250 for isolating internal portions of the edge computing apparatus 200 from an external environment. The isolation system 250 may include a chamber 252 defined by a top cover 254, a plurality of sides 256 and a door 258.

The isolation system 250 may be configured to secure contents of the edge computing apparatus 200, e.g., the server racks 210 or others, and to protect such contents from the elements while also restricting unauthorized access or entry into the chamber 252. For example, the isolation system 250 may be closed and sealed to maintain the chamber 252 in any desired condition, e.g., at selected levels of temperature, pressure and humidity, and access to the chamber 252 may be provided by way of the door 258 following the operation of one or more access control systems, e.g., any remotely activated locking systems for such doors or other portals. Components of the isolation system 250 may have any quality, strength or security ratings. Furthermore, materials from which the cover 254, the sides 256 or the door 258 are formed or constructed may be selected to further provide radiofrequency shielding or to serve other protective functions for contents of the chamber 252.

Components of the isolation system 250 may also serve one or more other purposes, in addition to enclosing and securing portions of the edge computing apparatus 200 contents of the chamber 252 therein. For example, portions of the isolation system 250 may also provide structural support to the housing 270 or any other portions of the edge computing apparatus 200.

The housing 270 may have any size or shape, and may take any form. In some implementations, the housing 270 may be a shipping container, or a similar vessel, of any standard shape or length. For example, in some implementations, the housing 270 may be a 40-foot vented shipping container constructed from steel and having one or more steel frames and/or castings that are sufficiently durable and strong enough to accommodate cargo, and to withstand impacts due to stacking, shocks or other contact during normal operation. In other implementations, the housing 270 may be made from a non-steel material, which may be appropriate where the containerized units 290 are deployed across wide geographical areas and need not be stacked, enabling lighter and more cost-effective materials other than steel to be used to form the housing 270. Additionally, in some implementations, the housing 270 may take the form of an intermodal container having standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft).

Implementations of the present disclosure may be operated, performed or executed by any type or form of computing device, apparatus or system, and need not be limited to the edge computing apparatus 200 of FIGS. 2A and 2B. Such devices, apparatuses or systems may include, but need not be limited to, cameras, mobile devices (e.g., smartphones, tablet computers, or the like), desktop computers, laptop computers, tablet computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Figure 3A:
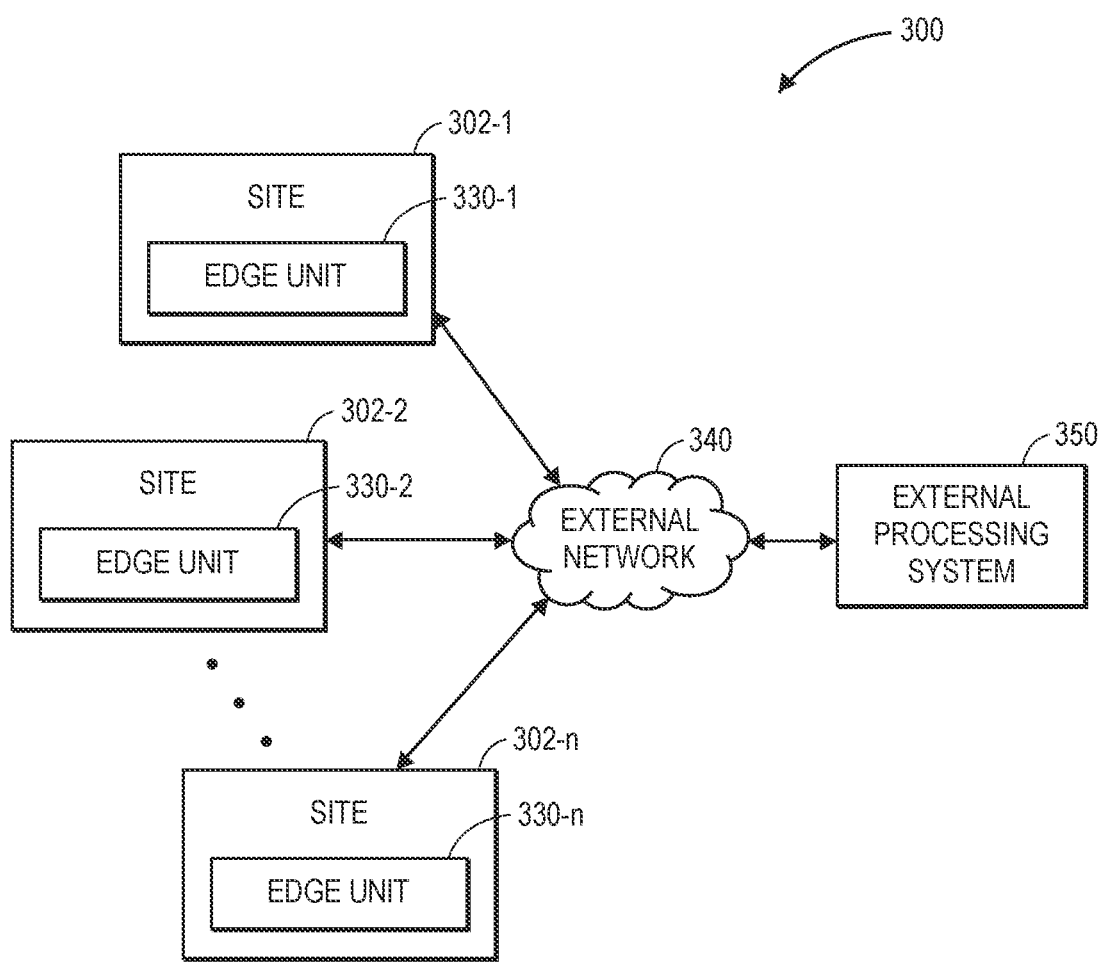
FIGS. 3A and 3B are views of aspects of one system in accordance with embodiments of the present disclosure.
Figure 3B:
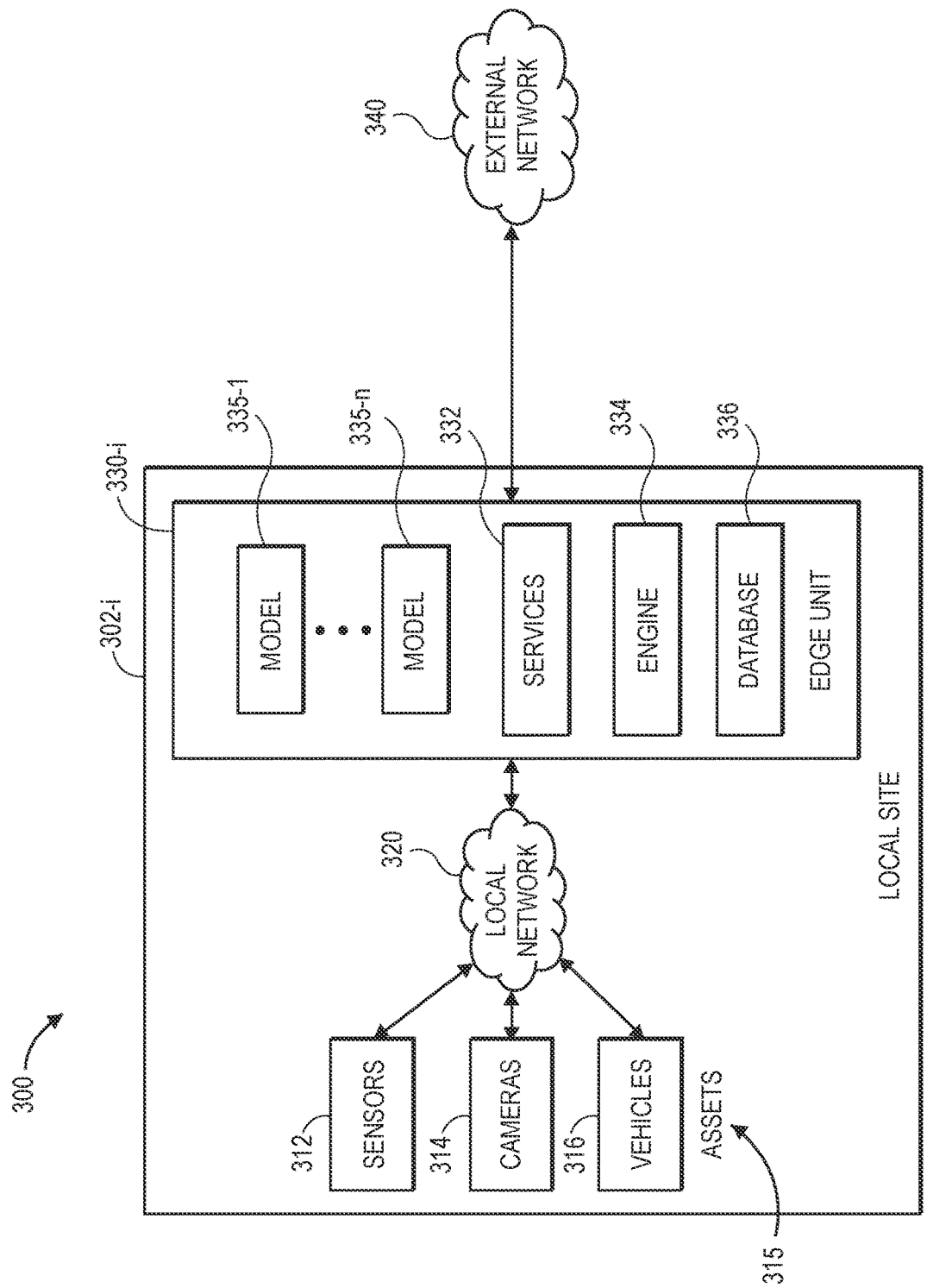

Edge computing apparatuses may be provided at any site or location and in any number, and may be connected to one another or any external systems over one or more external networks. Referring to FIGS. 3A and 3B, block diagrams of one system 300 in accordance with implementations of the present disclosure are shown.

As is shown in FIG. 3A, the system 300 includes a plurality of edge computing units (or systems) 330-1, 330-2 . . . 330-$n$ and an external processing system 350. The plurality of edge computing units 330-1, 330-2 . . . 330-$n$ are distributed at various local sites 302-1, 302-2 . . . 302-$n$, which may also be referred to herein as "edge locations," and connected to one another and the external processing system 350 over an external network 340, which may include the Internet in whole or in part. Each of the sites 302-1, 302-2 . . . 302-$n$ may include any number of edge computing units 330-1, 330-2 . . . 330-$n$.

As is shown in FIG. 3B, a representative one of the sites 302-1, 302-2 . . . 302-$n$ including a representative one of the edge computing units 330-1, 330-2 . . . 330-$n$ is shown. The edge computing unit 330-$i$ may be used to implement or perform one or more aspects of the present disclosure. The edge computing unit 330-$i$ may also be referred to as an "edge device" or an "edge compute unit." In some implementations, the edge computing unit 330-$i$ may be provided as a high-performance compute and storage ("HPCS") and/or elastic-HPCS ("E-HPCS") edge device. As is further shown in FIG. 3B, the edge computing unit 330-$i$ may be in communication with any number of assets 315 at the site 302-$i$, including one or more sensors 312, one or more cameras 314, and one or more vehicles 316, or others, and may transmit information or data to such assets 315, or receive information or data from such assets 315, during operations of such assets 315 at the site 302-$i$, over one or more local networks 320. Such local networks 320 may include, but need not be limited to, one or more networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols.

The site 302-$i$ may be any one of a plurality of environments or deployment locations associated with the edge computing unit 330-$i$. The site 302-$i$ may be a geographic location or area associated with an enterprise user (or another user) of edge computing, or an edge location in a data network topography in terms of data network connectivity. Alternatively, or additionally, the site 302-$i$ may be both a geographic location of an enterprise user and an edge location in the data network topography.

The edge computing unit 330-$i$ may be configured as a containerized edge compute unit or data center for implementing sensor data generation or ingestion and inference for one or more trained machine learning or artificial intelligence models provided thereon. For instance, the edge computing unit 330-$i$ may include computational hardware components configured to perform inference for one or more trained machine learning or artificial intelligence models. As is shown in FIG. 3B, one portion of the edge computing unit 330-$i$ may include hardware resources associated with or used to implement a first model 335-1, while another portion of the edge computing unit 330-$i$ may include hardware resources associated with or used to implement an n-th model 335-$n$, where n may be any number of different machine learning or artificial intelligence models that may be operated simultaneously or in parallel. The model or models executing by the edge computing unit 330-$i$ may also be referred to herein as an "edge model" or "edge models."

In some cases, the system 300 may utilize the edge computing systems 330-1, 330-2 . . . 330-$n$ provided at one or more of the sites 302-1, 302-2 . . . 302-$n$ to capture and process information or data received locally via the local networks 320, e.g., from any of the assets 315, and transmit the data to one or more external computing systems 350 over one or more external networks 340.

The local network 320 may provide any number of communication links between the edge computing system 330-$i$ and respective ones of the assets 315. In some implementations, one or more aspects of the local network 320 may be implemented as a private or public "5G" network, "4G" network, "Long-Term Evolution" network, or other cellular network. Alternatively, or additionally, one or more aspects of the local network 320 may be implemented as a Wireless-Fidelity (or "Wi-Fi") network, a Bluetooth® network, a Zigbee network, a Z-wave network, a Long Range (or "LoRa") network, a Sigfox network, a Narrowband Internet of Things (or "NB-IoT") network, or any other short-range wireless network.

The edge computing unit 330-$i$ may receive different types of information or data from any number of the assets 315, and may transmit any type of information or data received from such assets 315 to any number of external computing systems 350. For example, in some implementations, the edge computing unit 330-$i$ may receive streams of information or data from any of the sensors 312, which may include but need not be limited to one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 312 may also include any number of memory or storage components and processors, photosensitive surfaces, filters, chips, electrodes, clocks, boards, timers or any other relevant features (not shown) for aiding in their operation.

In some implementations, the edge computing unit 330-$i$ may also receive streams of information or data from any of the cameras 314, which may include imaging devices of any type or form, e.g., digital cameras, depth sensors or range cameras, infrared cameras, radiographic cameras or other optical sensors. The cameras 314 may be configured to photograph or otherwise capture visual information or data (e.g., still or moving images in color or black and white that may be captured at any frame rates, or depth imaging data such as ranges), or associated audio information or data, or metadata, regarding objects or activities occurring at the site 302-$i$, or for any other purpose.

For example, the cameras 314 may be configured to capture or detect reflected light if the reflected light is within fields of view of the cameras 314, which may be defined as a function of a distance between an imaging sensor and a lens within one of the cameras 314, viz., a focal length, as well as positions of the cameras 314 and angular orientations of their respective lenses. The cameras 314 may further include manual or automatic features for modifying a field of view or orientation. For example, one or more of the cameras 314 may be configured in a fixed position, or with a fixed focal length (e.g., fixed-focus lenses) or angular orientation. Alternatively, one or more of the cameras 314 may be configured with actuated or motorized features for adjusting a position, a focal length (e.g., zooming the imaging device) or an angular orientation (e.g., the roll angle, the pitch angle or the yaw angle), by causing a change in a distance between the imaging sensor and the lens (e.g., optical zoom lenses or digital zoom lenses), a change in a position of the cameras 314, or a change in one or more of the angles defining the angular orientation of the cameras 314.

In some implementations, one or more of the cameras 314 may be an imaging device that is hard-mounted to a support or mounting that maintains the cameras 314 in a fixed configuration or angle with respect to one, two or three axes. Alternatively, one or more of the cameras 314 may be provided with one or more motors and/or controllers for manually or automatically operating one or more of the components, or for reorienting the axis or direction of the cameras 314, i.e., by panning or tilting the cameras 314. Panning the cameras 314 may cause a rotation within a horizontal plane or about a vertical axis (e.g., a yaw), while tilting the cameras 314 may cause a rotation within a vertical plane or about a horizontal axis (e.g., a pitch). Additionally, one or more of the cameras 314 may be rolled, or rotated about its axis of rotation, and within a plane that is perpendicular to the axis of rotation and substantially parallel to a field of view of the cameras 314.

In some implementations, the edge computing unit 330-$i$ may also receive streams of information or data from any of the vehicles 316, which may include, but need not be limited to, one or more autonomous ground vehicles, one or more autonomous aerial vehicles (e.g., drones), or any other vehicle of any type, such as cars, trucks, trailers, freight cars, container ships or aircraft, which may be manned or unmanned (e.g., drones). Such vehicles 316 may be outfitted with any number of the sensors 312 or the cameras 314 described herein.

The vehicles 316 may receive information or data of any type or form from the edge computing unit 330-$i$, and transmit information or data of any type or form to the edge computing unit 330-$i$. The vehicles 316 may also receive information or data of any type or form from the edge computing unit 330-$i$, and transmit information or data of any type or form to the assets 315, e.g., the sensors 312 or the cameras 314. For example, in some implementations, the edge computing unit 330-$i$ may provide information or data regarding any number of configurations or controls to the assets 315. In some other implementations, the edge computing unit 330-$i$ may receive onboard camera feed and other sensor information, e.g., 3D range scanner, LiDAR, or odometry information for Simultaneous Localization and Mapping (or "SLAM"), from the vehicles 316, and may transmit any number of instructions to the vehicles 316.

Additionally, in some implementations, the edge computing unit 330-$i$ may be further utilized to execute one or more sets of instructions for locally storing information or data, executing one or more of the models 335-1 . . . 335-$n$, e.g., for inference, predictions or responses, or performing any other tasks or functions at the edge computing unit 330-$i$, with limited to no reliance on any external computing systems 350, e.g., in the "cloud." For example, the edge computing unit 330-$i$ may also be used to perform inference or generate predictions locally, e.g., by executing one or more of the trained or pretrained machine learning or artificial intelligence models 335-1 . . . 335-$n$ that may be received from any external computing systems 350 or any other edge computing units.

Results or predictions generated by the models 335-1 . . . 335-$n$ may be compressed and periodically uploaded by the edge computing unit 330-$i$ to external computing systems 350, e.g., in the "cloud," over the external network 340, which may include a satellite network configured to provide wireless satellite connectivity between the edge computing unit 330-$i$ at the site 302-$i$ and existing network infrastructure. Such results or predictions may be included in batch uploads transmitted over the external network 340, which may act as an Internet backhaul link, to any number of external computing systems 350. Additionally, in some implementations, results or predictions may be utilized immediately at the edge computing unit 330-$i$, and transmitted in compressed form to the external computing systems 350, e.g., in the "cloud," at a later time. For example, the external network 340 may be used to provide periodic transmission or upload of compressed prediction or inference results, e.g., during high-bandwidth or low-cost availability hours associated with the external network 340.

In some implementations, results or predictions may be obtained by performing one or more essential functions or tasks using the models 335-1 . . . 335-$n$, while offloading more computationally intensive and/or less time-sensitive tasks from the edge computing unit 330-$i$ to other machine learning or artificial models executed by one or more external computing systems 350, e.g., in the "cloud." For example, in some implementations, machine learning or artificial intelligence models operated by remote computing systems, e.g., the external computing systems 350, may be utilized to train or fine-tune one or more of the models 335-1 . . . 335-$n$, and updated versions of such models may be transmitted to the edge computing unit 330-$i$ over the external networks 340, e.g., via a network backhaul. In some implementations, the models 335-1 . . . 335-$n$ may be trained, fine-tuned, retrained or replaced in an iterative or continuous manner. For example, in some implementations, the edge computing unit 330-$i$ may be configured to perform scheduled or periodic downloads or updates of the models 335-1 . . . 335-$n$ based on information or data received from the external computing systems 350. Downloads or updates of the models 335-1 . . . 335-n may be distributed to the edge computing unit 330-i in a "push" fashion, whereby the external computing systems 350 transmit updated or new models to the edge computing unit 330-i over the external networks 340, e.g., via a network backhaul, as updated or new models become available.

The edge computing unit 330-i may further include any number of services 332 for executing or operating with any external computing systems 350, e.g., in the "cloud," as well as an engine 334 (e.g., a high-performance compute engine) for implementing or managing the models 335-1 . . . 335-n, and one or more databases (e.g., data stores) 336 for maintaining information or data of any type or form thereon.

Figure 4:
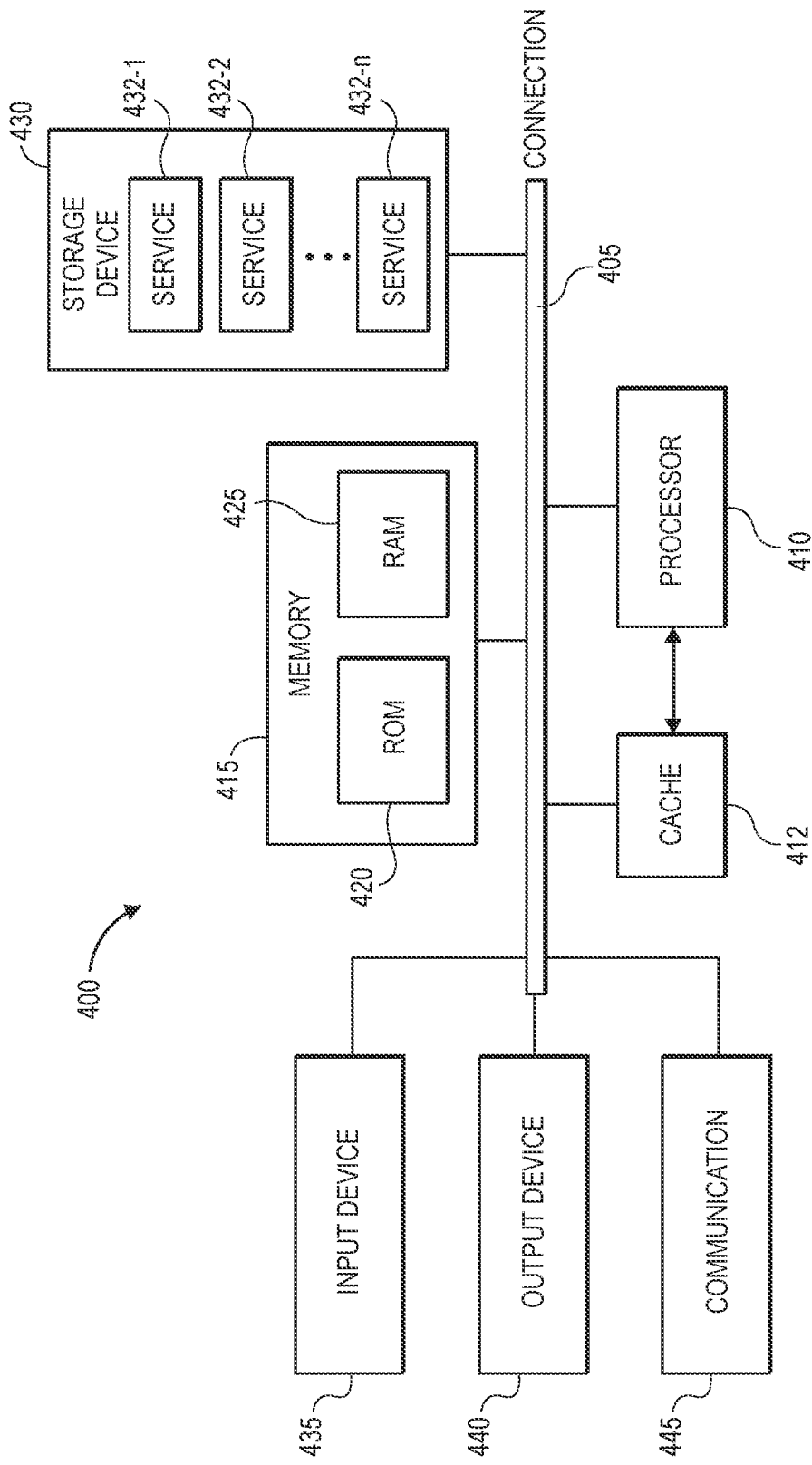
FIG. 4 is a view of aspects of one system in accordance with embodiments of the present disclosure.

Components of computing devices or systems described herein may be arranged or configured in any number of discrete architectures. Referring to FIG. 4, a computing device architecture 400 of the present disclosure is shown. In some examples, the computing device architecture 400 may be provided on an edge computing unit, such as the edge computing apparatuses 200 of FIGS. 2A and 2B, the edge computing units 330-i, 330-1, 330-2 . . . 330-n of FIGS. 3A and 3B, or any other edge computing apparatuses or units. Alternatively, or additionally, the computing device architecture 400 may be provided on any other type or form of computing devices, such as mobile devices (e.g., smartphones, tablet computers, or the like), desktop computers, laptop computers, tablet computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

As is shown in FIG. 4, components of the computing device architecture 400 may be in electrical communication with each other by way of a connection 405, e.g., a bus. The computing device architecture 400 shown in FIG. 4 includes a processor unit 410 (e.g., a CPU, a GPU, or another processor unit) coupled to various components of the computing device architecture 400, including but not limited to a set of memory components 415, e.g., a cache of high-speed memory connected directly with, in close proximity to, or integrated as part of the processor 410, such as read-only memory ("ROM") 420 and random-access memory ("RAM") 425. The processor unit 410 may be any general-purpose processor or a special-purpose processor, such as a self-contained system.

The computing device architecture 400 also includes a storage device 430 including one or more sets of data or instructions for performing various services 432-1, 432-2 . . . 432-n. The storage device 430 may be a non-volatile memory, a hard disk or another type of computer-readable media that may store data that is accessible to the computing device architecture 400 or other computers, such as magnetic cassettes, flash memory cards, solid state memory devices, digital versatile disks, cartridges, as well as the memory 415, e.g., the ROM 420, the RAM 425, and any others. One or more of the services 432-1, 432-2 . . . 432-n may be provided and executed for controlling the processor unit 410 or any other aspect of the computing device architecture 400.

The computing device architecture 400 further includes an input device 435, an output device 440 and a communications interface 445. The input device 435 enables interaction with the computing device architecture 400 and may represent any number of input mechanisms, e.g., a microphone for receiving sounds or speech signals, a touch-sensitive screen for receiving gestures or other manual inputs, or others. The output device 440 may represent any number of output mechanisms, e.g., a display, a projector, a television, a speaker device, or others. The communications interface 445 may be configured to govern or manage inputs received from users via the input device 435 and outputs to be provided to such users via the output device 440.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 5A:
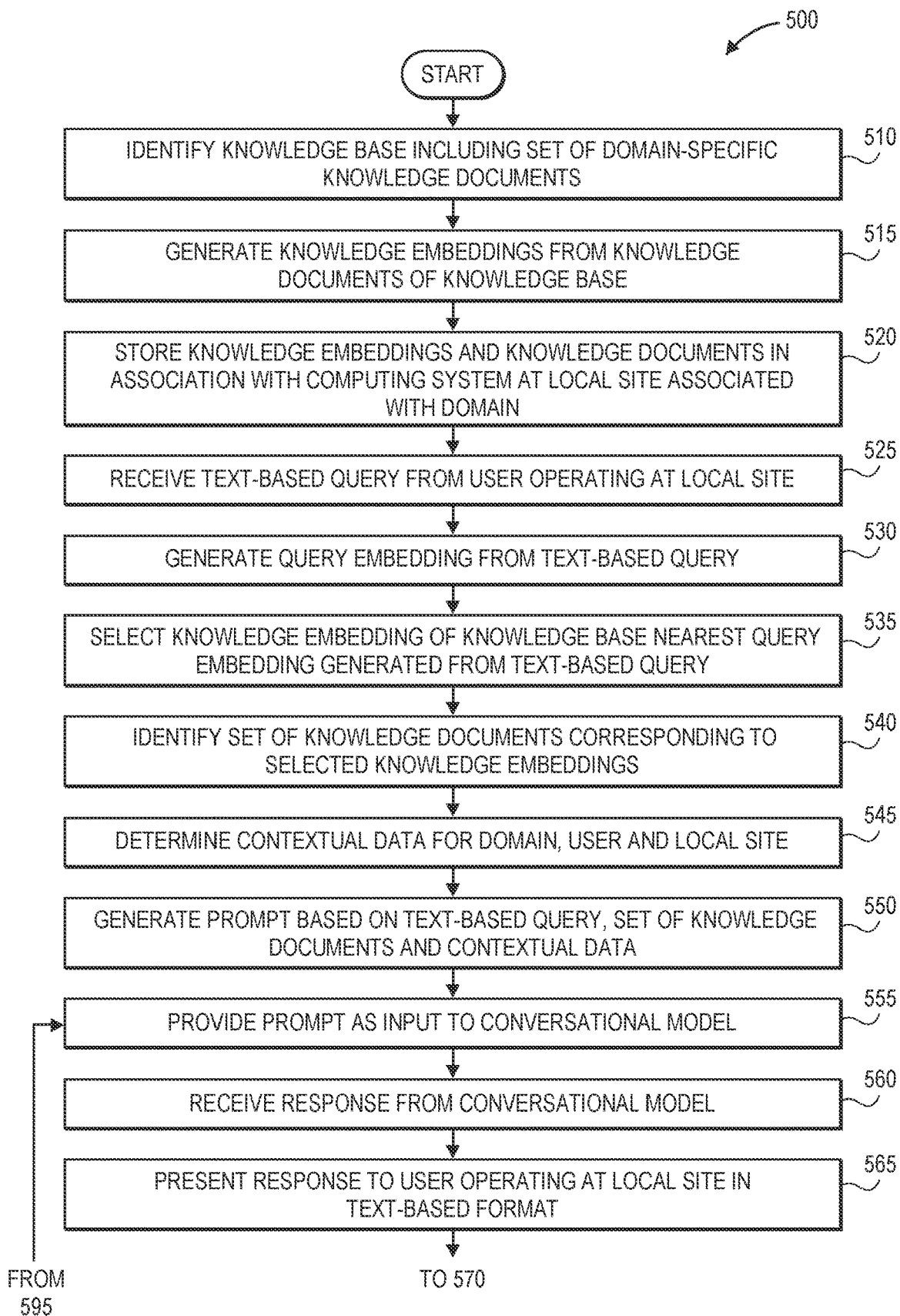
FIGS. 5A and 5B are a flow chart of one process in accordance with embodiments of the present disclosure.
Figure 5B:
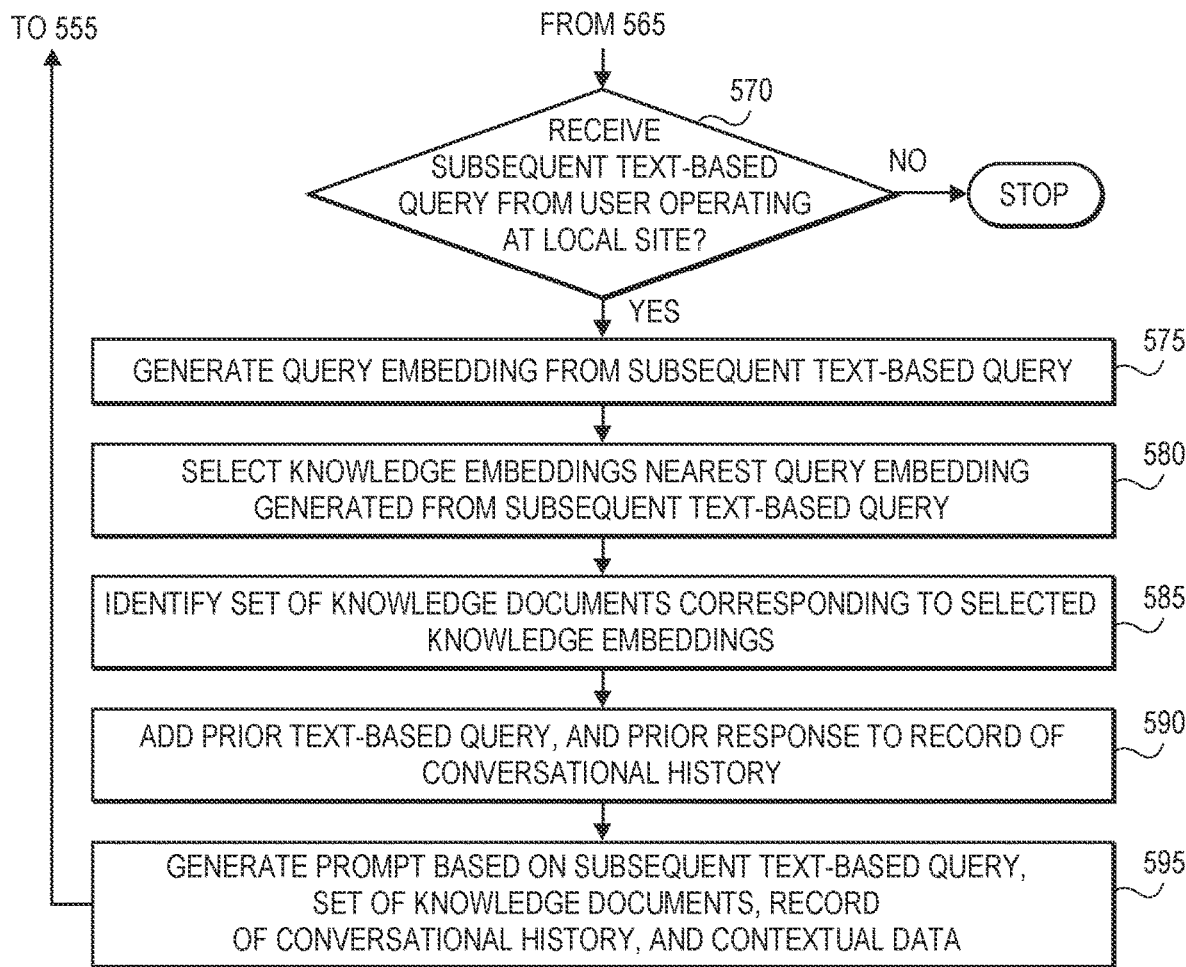

Referring to FIGS. 5A and 5B, a flow chart 500 of one process in accordance with implementations of the present disclosure is shown.

At box 510, a knowledge base including a set of domain-specific knowledge documents is identified. The knowledge documents of the knowledge base may be specific to a domain associated with a local site or an edge location, or to one or more services, devices or applications to be performed or executed at the local site or edge location. Such services, devices or applications may relate to the installation, maintenance or use of one or more systems or components at the local site or edge location, including but not limited to tasks or functions using such systems or components, as well as maintenance, updates or troubleshooting on such systems or components, or for any other purpose.

The knowledge base may be sufficiently large, and may include any number of knowledge documents, including but not limited to any number of pairs of questions and answers relating to topics that pertain to operations that may be performed by humans within a domain, at a site or in a location, or any other domain-specific information. For example, knowledge documents of a knowledge base, including but not limited to questions and answers thereto, may relate specifically to aspects of systems or applications (e.g., commercial, environmental, industrial, scientific, or others) within a domain that are exercised or performed at such sites or locations. The knowledge documents of the knowledge base may be stored or otherwise maintained in one or more data stores of an edge computing unit or, alternatively, in one or more physical or virtual locations, e.g., in the "cloud," which may be directly associated with a local site or an edge location at which an edge computing unit is to be operated, or indirectly associated with the local site or the edge location, such as with another party.

At box 515, knowledge embeddings are generated from documents derived from the knowledge documents of the knowledge base. The knowledge embeddings (or knowledge base embeddings or domain embeddings) may be generated from knowledge documents in any manner and according to any techniques, such as by providing such documents as inputs to a machine learning model, e.g., an embedding model having one or more transformers.

In some implementations, where the knowledge documents include pairs of questions and answers, the respective pairs of questions and answers, or dyads, may be amalgamated into individual documents and tokenized. For example, portions of a question-and-answer pair may be fragmented into smaller segments. Where a length of a knowledge document is exceedingly lengthy, such as where a question-and-answer pair or another knowledge document exceeds a predetermined limit on numbers of words or characters, one or more portions of the knowledge document may be truncated or otherwise reduced in length, as necessary. For example, because answers to questions may typically be more verbose or lengthy than the questions themselves, an answer of a question-and-answer pair may be truncated or otherwise reduced in length, as necessary. Portions of knowledge documents may be amalgamated or otherwise combined into a single document following truncation, as necessary. Alternatively, where knowledge documents include documents other than pairs of questions and answers, such documents may be processed, as necessary, such as by fragmentation, truncation, or in any other manner.

Once knowledge documents have been amalgamated, fragmented, truncated or otherwise processed, the individual knowledge documents may then be tokenized as necessary. The knowledge documents may be tokenized by any method or technique, such as by a byte-pair encoding (or "BPE") model, algorithm or technique. In some implementations, knowledge documents may be tokenized subject to limitations on numbers of tokens, e.g., four hundred tokens, or any other number of tokens.

Tokenized documents may be utilized to generate embeddings representative of the knowledge documents, e.g., by providing the tokenized documents as inputs to one or more trained models (e.g., transformers). The models may be trained in any manner to perform masked language modeling, permuted language modeling, or any other type or form of language modeling on tokenized documents and to generate embeddings from such documents. For example, in some implementations, the tokenized documents may be mapped to a vector space having any number of dimensions, e.g., a dense vector space having 256 dimensions, 512 dimensions, 568 dimensions, 1,024 dimensions, or any other number of dimensions. The embeddings generated based on the tokenized documents may represent or encapsulate a semantic composition or aspects of the respective documents, and utilized for any purpose.

At box 520, the knowledge embeddings and the knowledge documents are stored in association with a computer system provided at a local site associated with the domain. For example, the knowledge embeddings and the knowledge documents may be transmitted to the computer system over one or more external networks, which may include the Internet in whole or in part, or may be directly transferred or uploaded to the computer system. In some implementations, the computer system may be an edge computing unit having any of the characteristics, attributes or features of edge computing units described herein, or any other characteristics, attributes or features.

At box 525, a text-based query is received from a user operating at the local site. For example, the user may operate a computer device in communication with the computer system provided at the local site or edge location to enter one or more words or phrases representing a query via a physical or virtual keyboard. The computer device may be a mobile device such as a smartphone, a tablet computer or a wristwatch, as well as a laptop computer, a desktop computer, a kiosk, or any other system having one or more input/output devices for receiving information or data from users. In some implementations, the computer device may be dedicated for use in a single purpose or application or to a limited number of purposes or applications at the local site. Alternatively, the computer device may be a general-purpose machine intended for use in any number of purposes or applications. The types or numbers of computer devices by which text-based queries may be received from users in accordance with implementations of the present disclosure are not limited. In some implementations, the text-based query may be received from any number of sensors, devices or assets provided at the local site, or may be identified by interpreting information or data captured by such sensors, devices or assets.

At box 530, a query embedding is generated from the text-based query received at box 525. For example, the text-based query may be received by one or more devices or systems at a local site or edge location and transmitted, e.g., via a local network, to an edge computing unit or other computer system at the local site or edge location. In some implementations, the query embedding or any other embedding may be generated from the text-based query in the same manner that the knowledge embeddings was generated at box 515, such as by providing the text-based query to the same model that was used to generate the knowledge embeddings at box 515.

At box 535, a set of the knowledge embeddings generated from documents derived from the knowledge base is selected based on the text-based query. For example, a predetermined number of the set of knowledge embeddings generated at box 515 that are nearest or most similar to the query embedding generated at box 530 may be selected. Moreover, the set of knowledge embeddings may be selected subject to a distance threshold, such that only knowledge embeddings that are within a predetermined distance of the query embedding generated from the text-based query are selected for inclusion in the set.

In some implementations, the predetermined number may be three, such that not more than the three nearest or most similar knowledge embeddings are selected for inclusion in the set. Moreover, the predetermined number of the set of knowledge embeddings may be selected in any manner. For example, in some implementations, the predetermined number may be selected to limit an overall number of tokens to be provided to a conversational model (or conversational tool). Alternatively, in some implementations, there need not be any limit on a number of knowledge embeddings that are identified as nearest or most similar to the query embedding generated at box 530.

At box 540, a set of knowledge documents corresponding to the set of knowledge embeddings selected at box 535 is identified. For example, the set of knowledge documents may include the knowledge documents that were used to generate each of the knowledge embeddings of the set of embeddings selected at box 535. Such documents may include pairs of questions and answers thereto or any other knowledge documents in their entireties or, alternatively, portions of such documents, or amalgamated or truncated documents generated from such documents.

At box 545, contextual data is identified for the domain, the user and the local site. The contextual data may include any information or data relating to a context associated with the domain, or with the user or the local site, as well as any contextual information or data relating to the local site or edge location, or any other information or data. In some implementations, the contextual data may include, but need not be limited to, any guidelines or requirements for processing queries received from users, sensors, devices or assets, or for generating responses in reply to such queries.

At box 550, a prompt is generated based on the text-based query received at box 525, the set of knowledge documents identified at box 540 and the contextual data identified at box 545. The prompt may be generated in any manner and according to any function. In some implementations, the prompt may be generated by a computer function or set of instructions, e.g., coded in Python or in any other language, using syntax or instructions that bind information or data regarding the query received from the user at box 525, as well as the set of documents identified at box 540, and the contextual data identified at box 545, which may be amalgamated into a common prompt. In some implementations, the prompt may further include any number of tokens that demarcate between portions of the prompt. For example, the prompt may include tokens identifying a beginning of a document and an end of a document, as well as tokens identifying contextual data or system instructions.

At box 555, the prompt is provided as an input to a conversational model (or a conversational tool) operating on the computer system provided at the local site. For example, the conversational model may be a type or variant of a large language model, or "LLM," configured to receive inputs having any number of parameters. The conversational model may rely on one or more transformers or other machine learning models, algorithms or techniques, to receive sequences of words as inputs, and to recursively generate text-based outputs. In some implementations, the conversational model may have a transformer-based architecture having any number or type of activation functions or other attention mechanisms. The conversational model may rely on any positional embeddings, or other embeddings, and execute any normalization techniques. The conversational model may be further configured to receive inputs including embeddings having any contextual lengths or numbers of tokens. The conversational model may be trained to generate outputs using any type or form of training dataset, including but not limited to domain-specific datasets as well as other data sources that may be publicly or privately obtained, such as repositories, books, papers, code, sites, or others.

At box 560, a response is received in reply to the prompt from the conversational model, and at box 565, the response is presented to the user operating at the local site in a text-based format. For example, where the response includes a set of words, the set of words may be shown on a display of a device from which the user provided the query, or on another display of another device in association with the user. Alternatively, or additionally, audible signals representing the set of words may be emitted from speakers within a vicinity of the user, e.g., in headphones, earphones or "ear buds" worn by the user, or speakers mounted at or near a location where the user provided the query.

The response generated by the conversational model in reply to the prompt may take any form. In some implementations, the response may be a set of words provided in an unstructured format or, alternatively, arranged in phrases, sentences or paragraphs. Moreover, the response may be presented to the user in any manner. For example, in some implementations, the response may be displayed to the user on one or more displays, e.g., on a display of a computer device utilized by the user to provide the text-based query at box 525, or any other displays of any other devices that may be provided at a local site or edge location. Alternatively, or additionally, the response may be presented audibly or in any other manner, such as by causing sounds representing words of the response to be audibly played by one or more speakers or other acoustic emitters at the local site or edge location.

At box 570, whether a subsequent text-based query has been received from the user operating at the local site is determined. For example, after the response is presented to the user, the user may no longer require any further assistance, such as where the user is satisfied with the response that was presented at box 565. Alternatively, the user may attempt to seek assistance in any other manner, or may otherwise move on to a task or function that is different from a task or function that prompted the user to provide the query. If no further text-based queries are received from the user operating at the local site, the process ends. To the extent that the responses generated at box 560 were relevant and accurate to the text-based queries received from the user, the text-based queries received and the responses may be used to further train or fine-tune the conversational model that generated such responses, given that such queries were generated at the local site (or edge location) and are relevant to the domain. Alternatively, or additionally, the text-based queries and the responses may be added as knowledge documents to the knowledge base, along with embeddings (e.g., knowledge embeddings) generated based on such queries and responses.

If a subsequent text-based query has been received from the user, however, then the process advances to box 575, where a query embedding is generated from the subsequent text-based query. The subsequently received text-based query may be provided as an input to the same model that was used to generate the knowledge embeddings at box 515, or the query embedding at box 530, and another query embedding may be generated based on an output received from the model in response to the input.

At box 580, a set of knowledge embeddings that were generated at box 515 from knowledge documents of the knowledge base nearest the embedding generated at box 575 is selected. As is discussed above with regard to box 535, the set of knowledge embeddings may include a predetermined number of the set of knowledge embeddings generated at box 515 that are nearest or most similar to the query embedding generated at box 575, and may but need not be subject to a distance threshold or any other limitations or restrictions.

At box 585, a set of knowledge documents from which the set of knowledge embeddings selected at box 580 were generated is identified. The set of knowledge documents may include documents that were derived from question-and-answer pairs or other domain-specific information and used to generate each of the knowledge embeddings of the set selected at box 580, and may include the knowledge documents in their entireties or, alternatively, amalgamated or truncated documents generated from the knowledge documents.

At box 590, the prompt most recently provided as an input to the conversational model at box 555, and the response received in reply to that prompt at box 560, are added to a record of conversational history with the user.

At box 595, a prompt is generated based on the subsequent text-based query received from the user as determined at box 570, the set of documents corresponding to the selected embeddings identified at box 585, the set of contextual data identified at box 545, and the record of conversational history updated at box 590. As is discussed above with regard to box 550, the prompt may be generated in any manner, such as by a computer function, using syntax or instructions that bind information or data regarding the query received from the user at box 570, as well as the set of documents identified at box 585, the contextual data identified at box 545, and the record of conversational history updated at box 590, which may be amalgamated into a common prompt. In some implementations, the prompt may further include any number of tokens that demarcate between portions of the prompt. By combining the record of the conversational history with the query received from the user and the set of documents identified as most similar to the query, the conversational model may narrow down potential solutions to any issues that prompted the user to provide the query or subsequent queries, such as by suggesting potential causes of the issues, or actions to be taken in identifying such causes. Such solutions may include, but need not be limited to, recommended actions to take in diagnosing, investigating or troubleshooting the issues, as well as recommendations to have one or more additional humans (e.g., experts) to aid in diagnosing, investigating or troubleshooting such issues.

The process then returns to box 555, where the prompt generated at box 595 is provided as an input to the conversational model, and may continue as desired by the user, with additional prompts including a history of the conversation (e.g., queries and responses), updated as necessary.

Conversational tools of the present disclosure may receive data representing queries of users in any type or form, including but not limited to text, images or sounds, and engage in domain-specific conversations with such users by generating responses to such queries that are relevant to a domain and well-informed, and likewise include data of any type or form. Referring to FIGS. 6A through 6G, views of aspects of one system in accordance with embodiments of the present disclosure are shown.

Figure 6A:
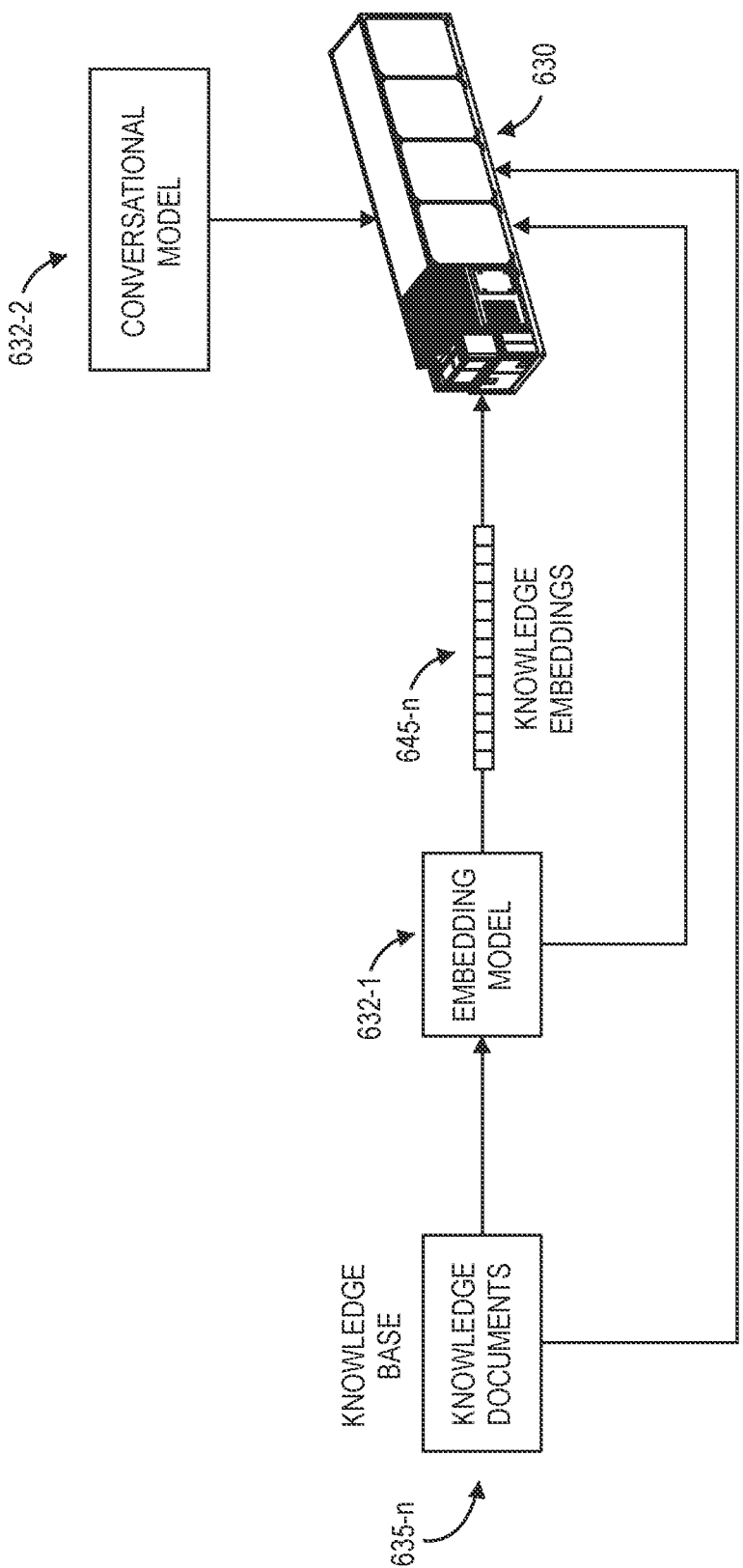
FIGS. 6A through 6G are views of aspects of one system in accordance with embodiments of the present disclosure.

As is shown in FIG. 6A, a knowledge base may include a plurality of knowledge documents 635-$n$. The knowledge documents 635-$n$ of the knowledge base may pertain to any domain, e.g., any discipline, field, industry, realm, specialty, subject, topic, or other grouping of information or data regarding operations at a local site or edge location at which an edge computing unit 630 may be provided. For example, the knowledge base may include questions and corresponding answers or other documents that are obtained from public or private domain-specific datasets or any other data sources, e.g., repositories, books, papers, code, sites, or others, which may be specific to certain connectivity, equipment, machinery, natural resources, personnel, power availability, weather, or other aspects of the local site or edge location.

Each of the knowledge documents 635-$n$ may be provided as inputs to an embedding model 632-1 that is configured to generate knowledge embeddings (or knowledge base embeddings or domain embeddings), or vectors or other sets of data representing a semantic description of the composition of the knowledge documents 635-$n$ of the knowledge base, which may be amalgamated into individual documents and tokenized, as necessary, such as to fragment portions of the knowledge documents 635-$n$ into smaller segments. For example, where a length of a given pair of a question and an answer exceeds a predetermined limit on numbers of words or characters, the question or the answer of the pair may be truncated or otherwise reduced in length, as necessary, before being concatenated into a single document representing the pair, and tokenized. In some implementations, an answer of a question-and-answer pair may be truncated or otherwise reduced in length, as necessary, prior to concatenation with the question of the question-and-answer pair. Alternatively, a question or an answer, or both a question and an answer, may be truncated or otherwise reduced in length, as necessary, prior to concatenation. Truncating portions of knowledge documents may serve to limit a total number of tokens generated from a document representing a knowledge document, and truncated portions of a knowledge document may be amalgamated or otherwise combined into a single document following truncation, as necessary.

The embedding model 632-1 may be configured to receive any number of tokens representing one of the knowledge documents 635-$n$ and generate knowledge embeddings 645-$n$ having any length and containing any number of values or dimensions from the corresponding one of the knowledge documents 635-$n$. The embedding model 632-1 may be trained or pre-trained in any manner, such as by masked language modeling, permuted language modeling, both masked language modeling and permuted language modeling, or in any other manner. For example, in some implementations, the embedding model 632-1 may be configured to receive individual documents having a maximum token length of approximately four hundred tokens, and to generate the knowledge embeddings in a vector space having 1,024 dimensions, or any other number of dimensions. Alternatively, the embedding model 632-1 may be configured to receive documents having any number of tokens, and generate embeddings in any vector space having any number of dimensions.

Once the knowledge embeddings 645-$n$ have been generated by the embedding model 632-1 based on the knowledge documents 635-$n$, the knowledge embeddings 645-$n$ and the knowledge documents 635-$n$ may be transmitted or otherwise transferred to the edge computing unit 630 for access thereby. Likewise, code for executing the embedding model 632-1 and a conversational model 632-2 (or conversational tool, or conversational agent) may be transmitted or otherwise transferred to the edge computing unit 630 for execution thereby. In some implementations, the knowledge documents 635-$n$ and the knowledge embeddings 645-$n$ of the knowledge base, and the code for executing the embedding model 632-1 and the conversational model 632-2 may be transmitted or otherwise transferred to the edge computing unit 630 in any manner, such as by a direct connection with another computer device, e.g., via a wired connection, or over one or more computer networks.

The embedding model 632-1 may be executed by any computer device or system to generate the knowledge embeddings 645-$n$ from the knowledge documents 635-$n$ of the knowledge base such as by an external processing system provided in one or more alternate or virtual locations, e.g., in a "cloud"-based environment. Alternatively, the knowledge documents 635-$n$ of the knowledge base may be transferred to the edge computing unit 630, which may execute the embedding model 632-1 on the knowledge documents 635-$n$ directly to generate the knowledge embeddings 645-$n$.

With the knowledge documents 635-$n$ and the corresponding knowledge embeddings 645-$n$ generated therefrom stored on the edge computing unit 630, and the edge computing unit 630 configured to execute the embedding model 632-1 and the conversational model 632-2, the edge computing unit 630 may be operated to receive queries from humans, sensors, devices or assets in a local site or edge location of the edge computing unit 630, and to generate responses to such queries in a conversational manner.

Figure 6B:
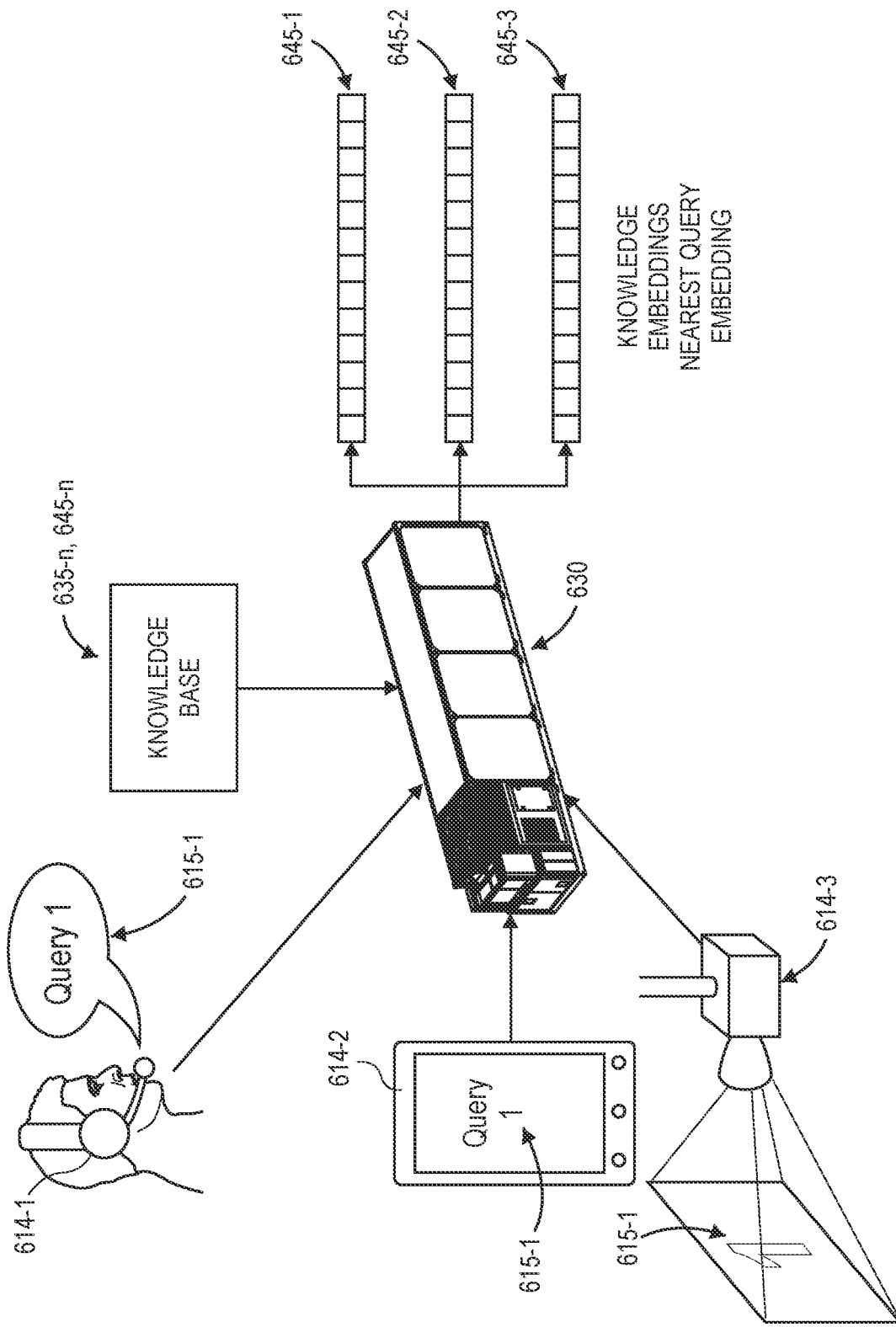

As is shown in FIG. 6B, the edge computing unit 630 may be configured to receive data representing a query 615-1 from a human (e.g., a worker) within a local site or edge location at which the edge computing unit 630 is provided in any manner. For example, the edge computing unit 630 may be configured to receive data in the form of audio data or signals representing the query 615-1 that may be captured by one or more devices 614-1 having one or more microphones or other acoustic sensors that is worn or carried by a human, e.g., a headset, earbuds, or another device or system. Acoustic data may be processed to identify any spoken or sung words represented therein, and the query 615-1 may be determined to include one or more of such words. Alternatively, or additionally, the edge computing unit 630 may be further configured to receive data in the form of one or more sets of text representing the query 615-1 that may be entered into a mobile device 614-2 (e.g., a smartphone, a tablet computer, a wristwatch or another mobile system) operated by the human. As yet another alternative, the edge computing unit 630 may be configured to receive data in the form of one or more images captured by a camera 614-3 that may be processed to detect or characterize contents of such images and determine the query 615-1 from the detected or characterized contents.

The edge computing unit 630 may be configured to receive data representing the query 615-1 from humans, systems, devices or assets in any form, e.g., one of audio data or signals, sets of text or images, or two or more of such forms. Based on the data representing the query 615-1, the edge computing unit 630 may be configured to generate one or more query embeddings, e.g., by providing such data as inputs to the embedding model 632-1 or in any other manner, and to identify a set of knowledge embeddings 645-1, 645-2, 645-3 of the knowledge embeddings 645-n of the knowledge base that are nearest or most similar to the query embeddings, and to identify pairs of questions and answers from which each of the embeddings 645-1, 645-2, 645-3 was generated.

Figure 6C:
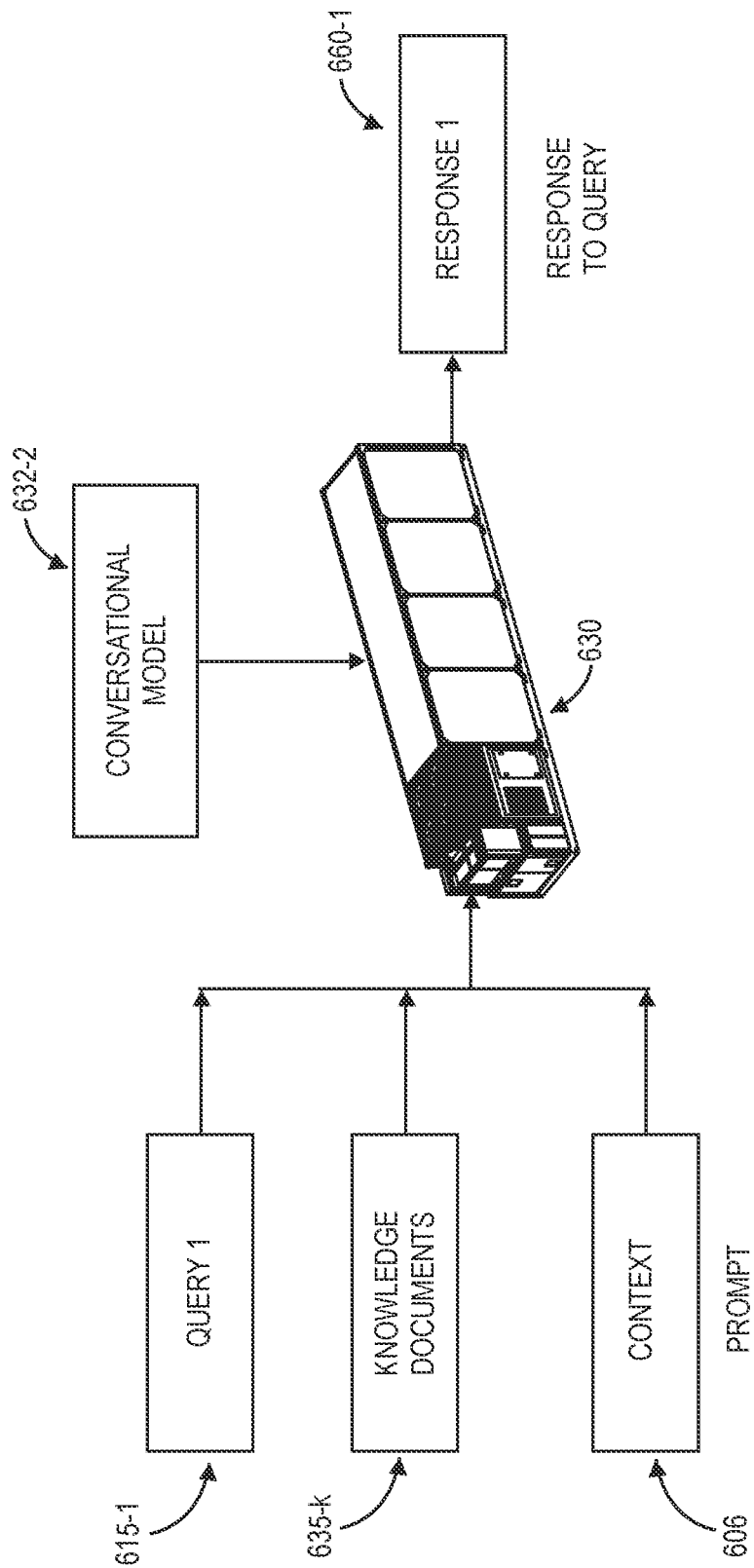

As is shown in FIG. 6C, a prompt may be generated based on the set of text representing the query 615-1, sets of text representing one or more knowledge documents 635-k from which the knowledge embeddings 645-1, 645-2, 645-3 were generated, and a set of contextual data 606, which may include any information or data associated with a context of the query 615-1, e.g., a domain to which the query 615-1 relates. The various sets of text of the query 615-1, the knowledge documents 635-k, or the contextual data 606 may be processed or filtered in any manner, e.g., to remove white space, extraneous characters, or characters denoting breaks or other features lacking content, such as newline characters, before combining such sets of text to generate or form the prompt. In some implementations, the prompt may be generated or formed according to a computer function or set of instructions, which may be coded in Python or in any other language.

Once the prompt has been formed, the prompt may be provided as an input to the conversational model 632-2 executed by the edge computing unit 630. The conversational model 632-2 may be any language model, such as a large language model (or "LLM") that may be proprietary or open-source (or open-access) in nature. The conversational model 632-2 may be initialized and configured or quantized in any manner. In some implementations, the conversational model 632-2 may have been pre-trained or trained using data obtained from publicly available sources or private sources. The conversational model 632-2 may have any architecture, e.g., a standard transformer architecture, or any other architecture, and may utilize any normalization or pre-normalization techniques.

A number of the knowledge documents 635-k to be represented in the prompt may be selected in any manner and on any basis. For example, the prompt may be limited to sets of text representing three knowledge documents, or any other number of knowledge documents, to limit an overall number of tokens to be provided to the conversational model 632-2. Alternatively, a number of knowledge documents that are identified and provided as inputs to the conversational model 632-2 need not be limited. Furthermore, in some implementations, knowledge documents identified as nearest the query 615-1 may be subject to a distance threshold, such that only knowledge embeddings that are within a predetermined distance of a query embedding are identified.

As is further shown in FIG. 6C, the conversational model 632-2 may generate one or more responses 660-1 to the query 615-1 as outputs in reply to the prompt. The response 660-1 may be represented as a set of text generated by the conversational model 632-2 based on the actual text of the query 615-1, the sets of text representing the nearest knowledge documents 635-k, the contextual data 606, or any other information or data.

Figure 6D:
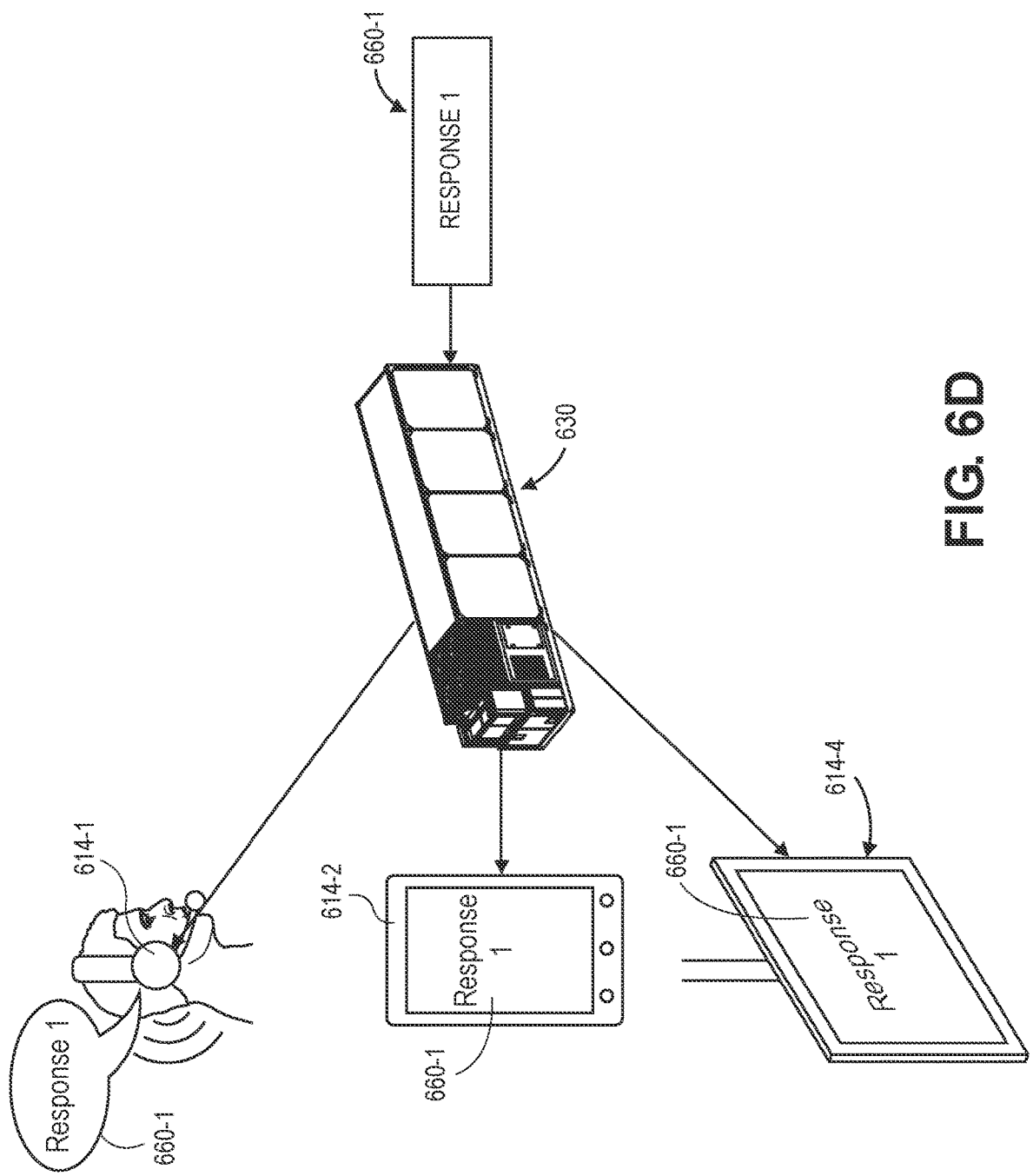

As is shown in FIG. 6D, the edge computing unit 630 may return the response 660-1 to the human that generated the query 615-1 in any manner. For example, the edge computing unit 630 may generate a set of audio data that represents words of the response 660-1 in an audible manner, and transmit the set of audio data to the device 614-1, which may play the audio data to the human. The edge computing unit 630 may further transmit a set of text representing the response 660-1 to the mobile device 614-2, which may display the set of text to the human on one or more displays. The edge computing unit 630 may also identify one or more images representative of the response 660-1 and transmit such images to a display 614-4, where such images may be viewed by the human that provided the query 615-1 or any other humans. Alternatively, or additionally, data representing the response 660-1 may be transmitted to multiple devices for presentation to the human that provided the query 615-1 or others, and may take multiple forms.

Figure 6E:
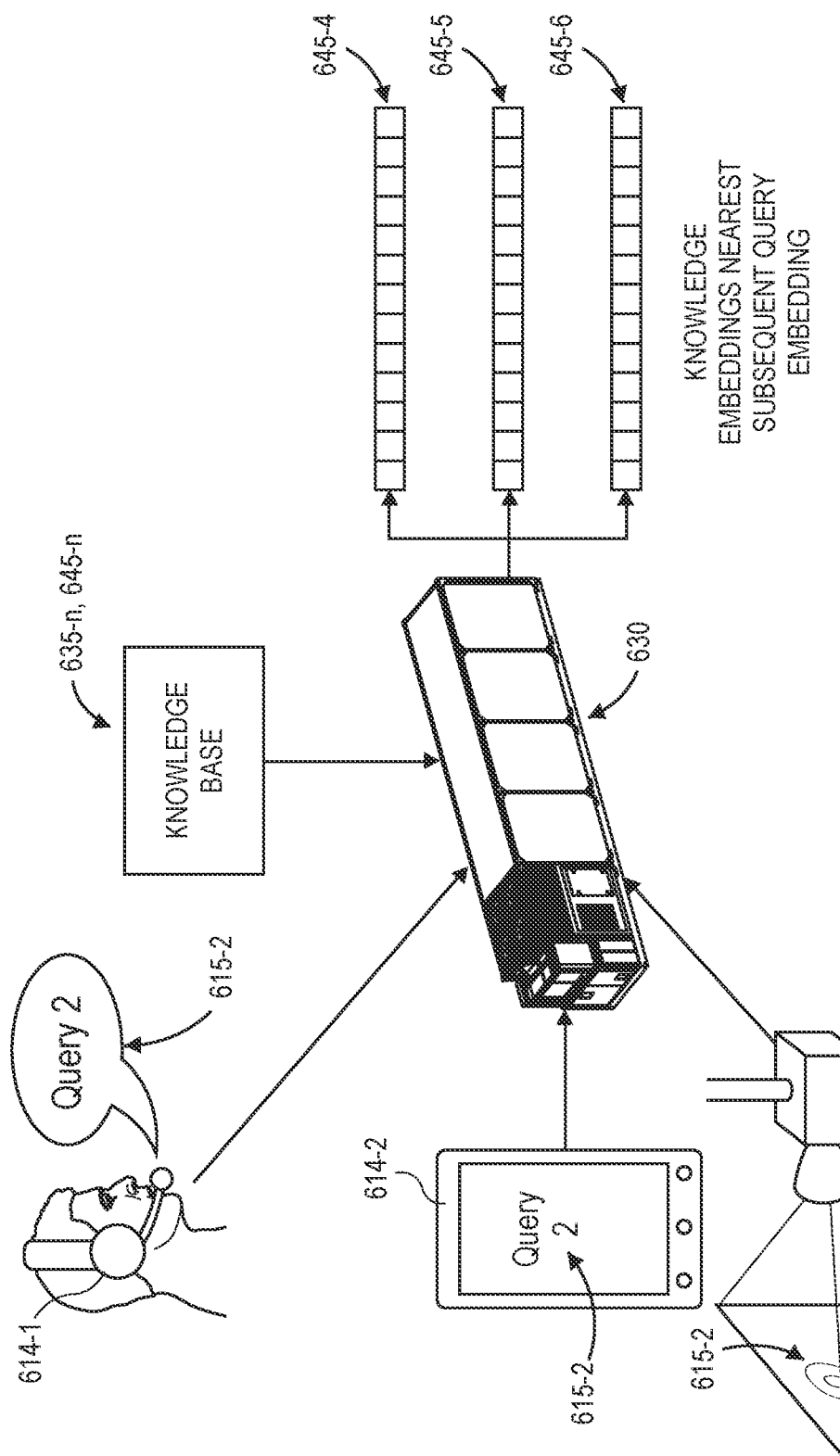

In accordance with implementations of the present disclosure, edge computing units may engage in domain-specific conversations with humans by generating responses to subsequent queries using models that consider aspects of conversational history when generating such responses. As is shown in FIG. 6E, a human may generate a subsequent query 615-2 in the manner referenced above with regard to FIG. 6B, or in any other manner, such as by uttering spoken or sung words that are captured by the device 614-1, typing sets of text into the mobile device 614-2, or capturing images using the camera 614-3. Data representing the subsequent query 615-2 may be transmitted to the edge computing unit 630, which may generate queries based on the data representing the subsequent query 615-2 and identify a predetermined number of embeddings 645-4, 645-5, 645-6 of the knowledge base that are nearest or most similar to the subsequent query 615-2.

Figure 6F:
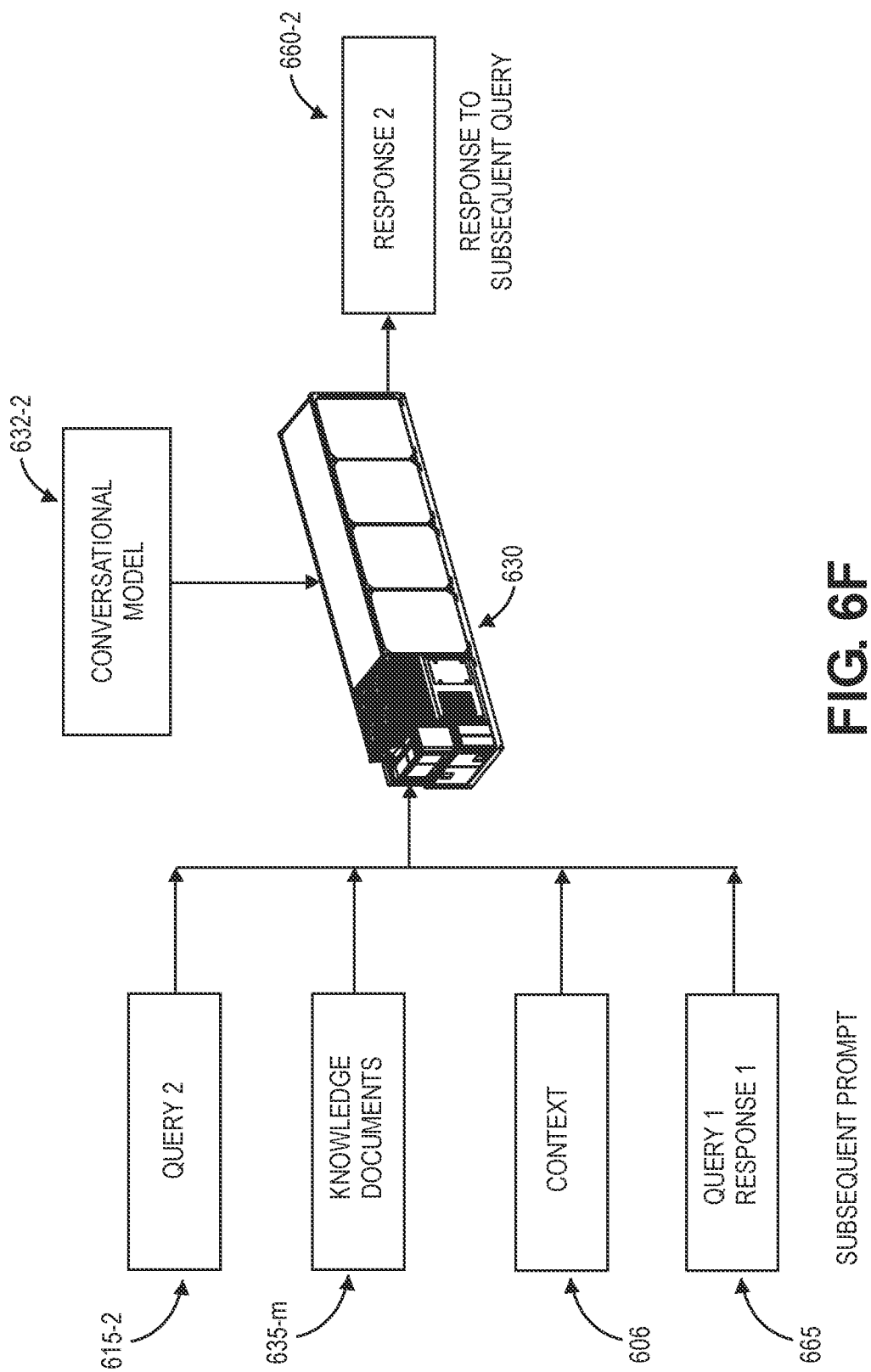

As is shown in FIG. 6F, a subsequent prompt may be generated by providing sets of text representing the query 615-2, sets of text representing one or more of the knowledge documents 635-m from which the embeddings 645-4, 645-5, 645-6 were generated, and the set of contextual data 606, as well as a set of text 665 representing the conversational history, including the query 615-1 and the response 660-1, as inputs to the conversational model 632-2 in a manner similar to that referenced above with regard to FIG. 6C. For example, the various sets of text of the query 615-2, the knowledge documents 635-m, the contextual data 606 and the set of text 665 representing the conversational history may be processed or filtered in any manner before combining such sets of text to generate or form the subsequent prompt. In some implementations, the subsequent prompt may be generated or formed according to a computer function or set of instructions, which may be coded in Python or in any other language. The subsequent prompt may then be provided as an input to the conversational model 632-2, and a subsequent response 660-2 may be generated based on an output received in response to the conversational model 632-2.

Figure 6G:
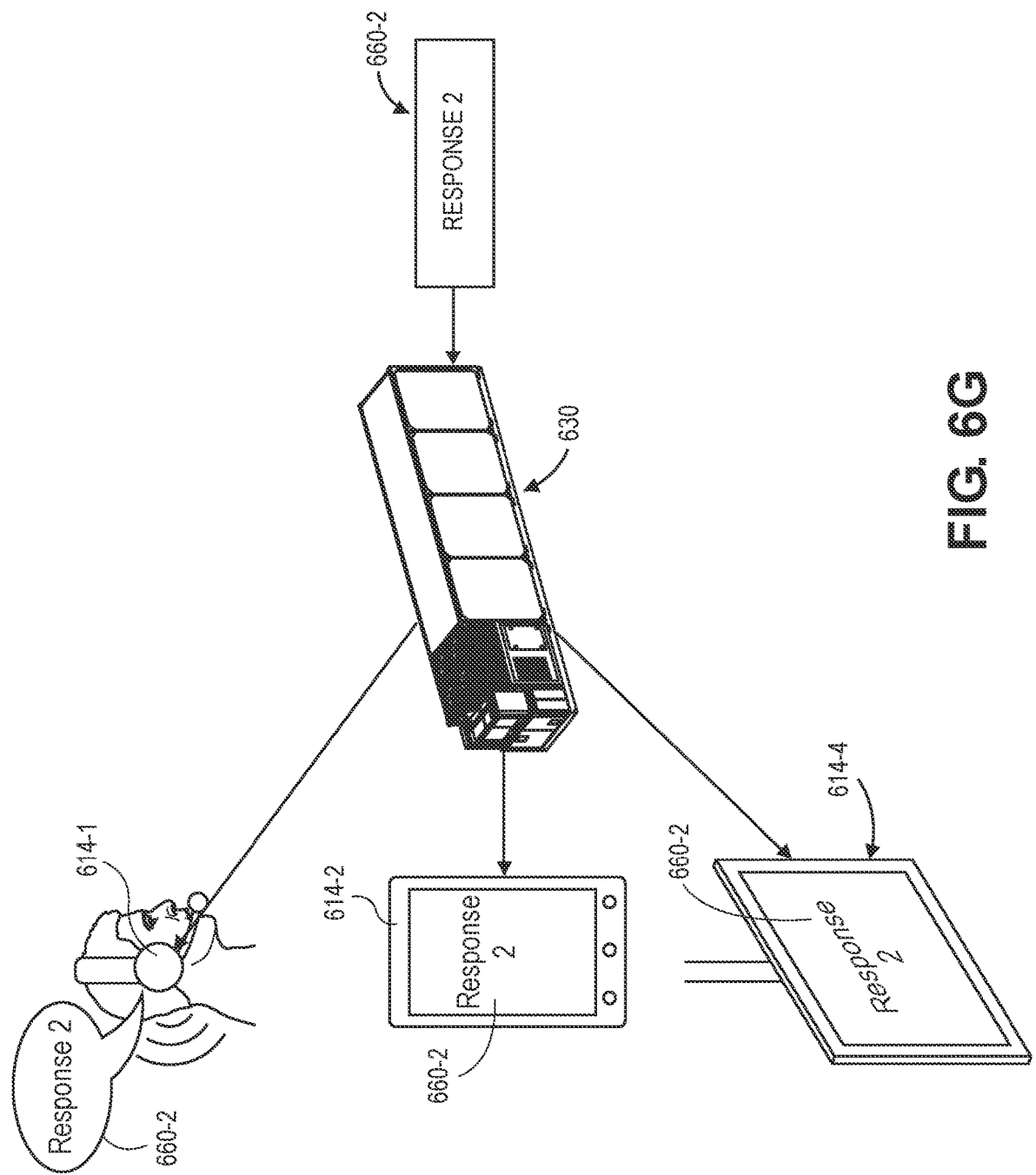

As is shown in FIG. 6G, the edge computing unit 630 may return the subsequent response 660-2 to the human that generated the queries 615-1, 615-2 in the same or a similar manner as is shown in FIG. 6D, or in any other manner. For example, the edge computing unit 630 may generate and transmit a set of audio data that represents words of the response 660-2 in an audible manner to the device 614-1 for playing to the human, transmit a set of text representing the subsequent response 660-2 to the mobile device 614-2 for displaying to the human on one or more displays, and identify one or more images representative of the subsequent response 660-2 and transmit such images to a display 614-4, where such images may be viewed by the human that provided the subsequent query 615-2 or any other humans. Alternatively, or additionally, data representing the subsequent response 660-2 may be transmitted to multiple devices for presentation to the human that provided the subsequent query 615-2 or others, and may take multiple forms.

The generation of domain-specific responses by the edge computing unit 630 may continue for as long as the human continues to provide the queries to the edge computing unit 630.

Figure 7A:
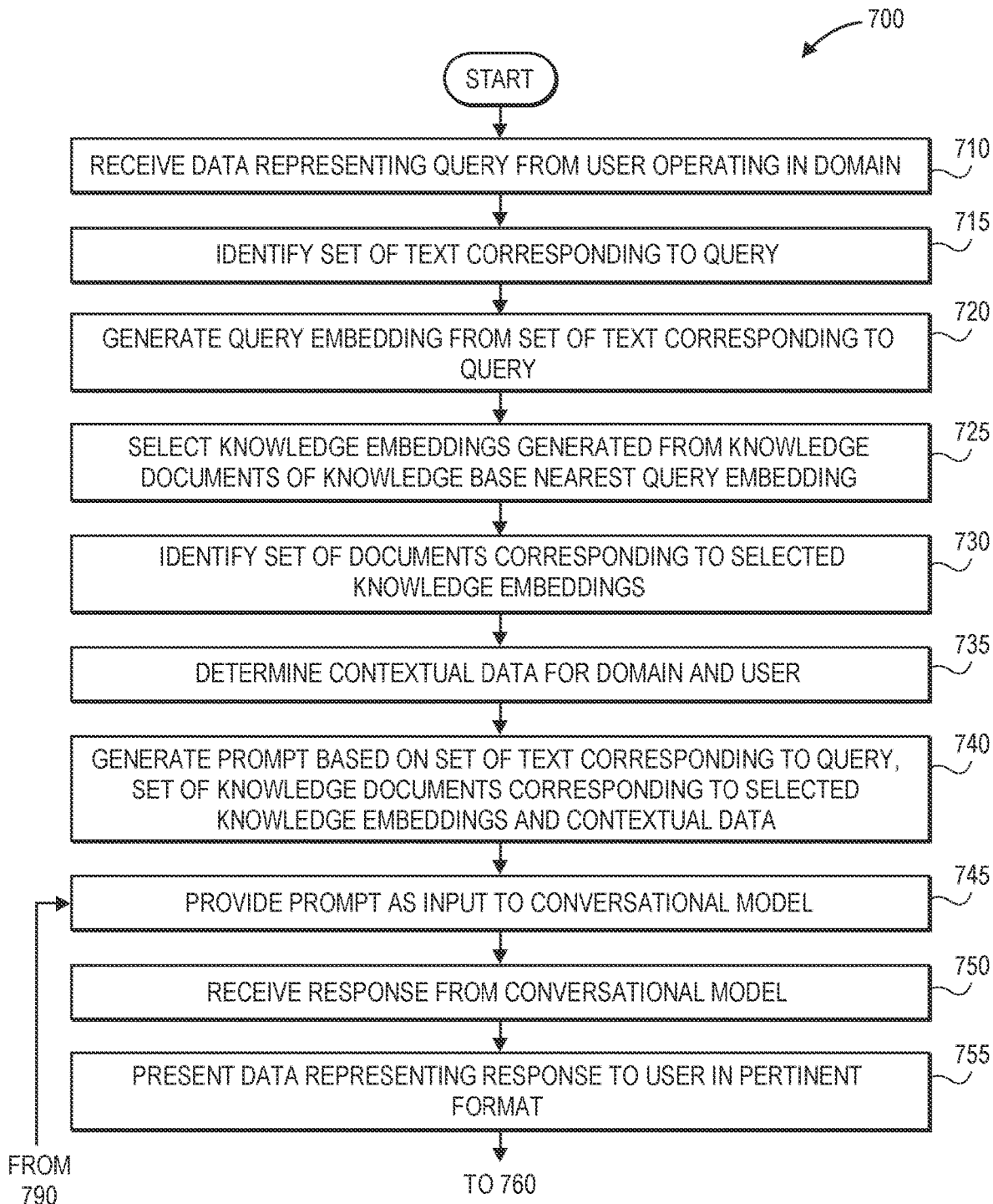
FIGS. 7A and 7B are a flow chart of one process in accordance with embodiments of the present disclosure.
Figure 7B:
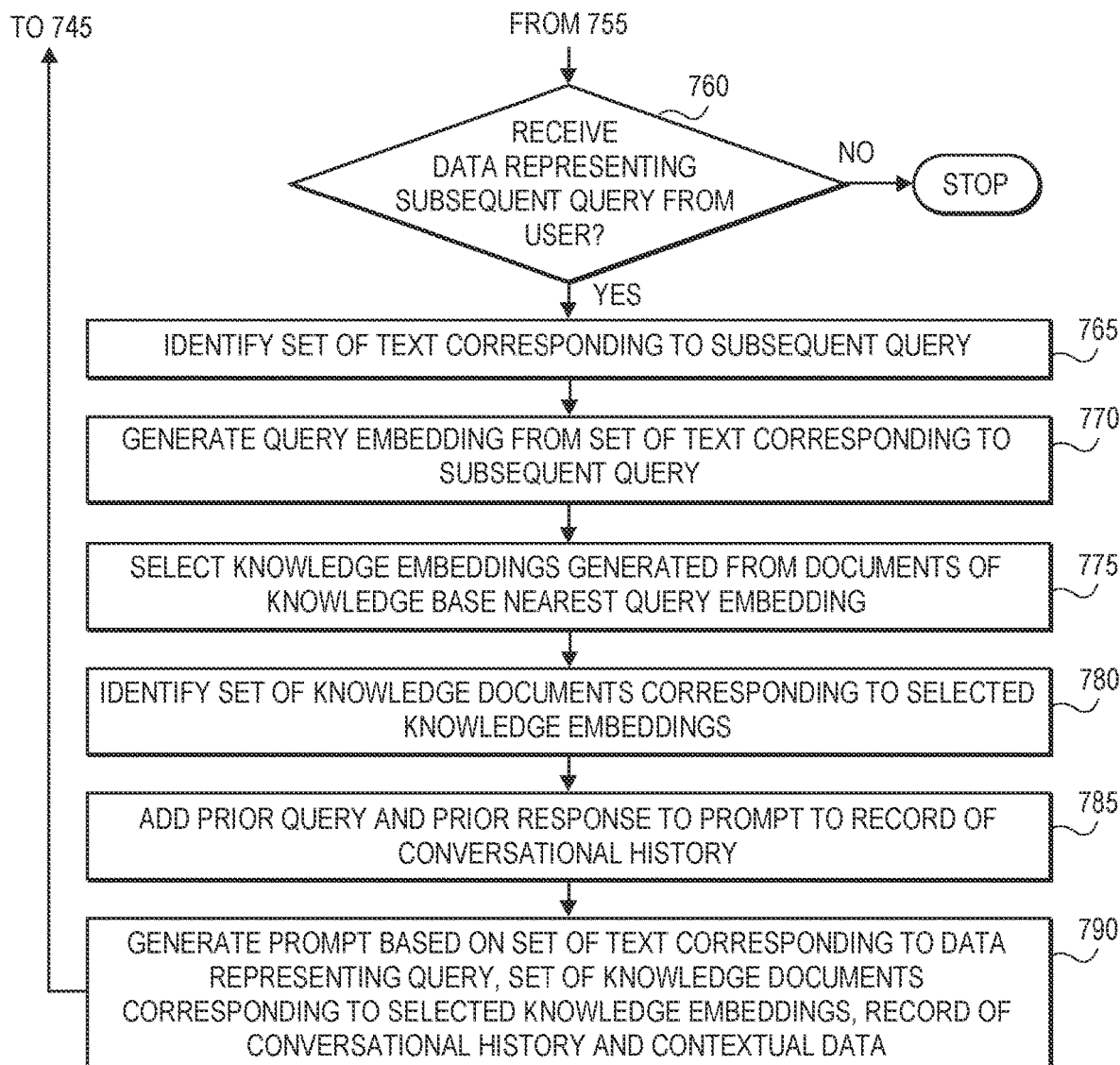

Referring to FIGS. 7A and 7B, a flow chart 700 of one process in accordance with implementations of the present disclosure is shown.

At box 710, data representing a query is received from a user operating in a domain. For example, the data may include entries of text representing the query provided by the user into a computer device such as a smartphone, a tablet computer, a desktop computer, a kiosk, or any other computer device, as well as signals or data representing utterances of any number of words spoken by the user. Such signals may be captured by one or more microphones or other acoustic sensors and transcribed into text or otherwise interpreted to identify the query of the user. Alternatively, the data may include one or more images, e.g., still images or video files, captured by one or more cameras or other sensors provided in a local site or edge location. In some other implementations, the data may include a text-based description of one or more images, which may be generated by one or more image-to-text tools or in any other manner.

At box 715, a set of text corresponding to the data representing the query is identified. For example, where the data contains text provided by a user, the set of text may include all or some of such text. Where the data includes an audio file representing words spoken by the user or any other sounds, the set of text may include a transcript of such words, or descriptions of such sounds. Where the data includes images, the set of text may include a text-based description of one or more of the images. The set of text may be identified or derived from the data in any manner or according to any technique, e.g., by one or more humans or machine learning models.

At box 720, a query embedding is generated from the set of text corresponding to the data. For example, the set of text corresponding to the data may be provided as an input to one or more trained models (e.g., transformers). Such models may be trained in any manner to perform masked language modeling, permuted language modeling, or any other type or form of language modeling on documents, and to generate embeddings from such documents. For example, in some implementations, the tokenized documents may be mapped to a vector space having any number of dimensions, e.g., a 256, 512, 768 or 1,024-dimension dense vector space. The query embedding generated thereby may represent or encapsulate a semantic composition or aspects of the set of text, and may be utilized for any purpose.

At box 725, knowledge embeddings generated from domain-specific knowledge documents of a knowledge base that are nearest the query embedding generated at box 720 are selected. For example, where a domain-specific knowledge base includes a plurality of question-and-answer pairs, knowledge embeddings may be generated from the question-and-answer pairs by amalgamating the pairs into individual documents and tokenizing the documents before providing the tokenized documents to a model, e.g., the same model by which the embedding was generated at box 720, to generate embeddings representative of or encapsulating semantic compositions or aspects of such documents. Nearness or similarity of knowledge embeddings generated from knowledge documents of the knowledge base to the query embedding generated at box 720 may be determined in any manner, such as based on Euclidean distances between such embeddings, cosine similarity or dot product similarity of such embeddings, or in any other manner. A predetermined number of knowledge embeddings, viz., three, may be selected on any basis, such as any criteria or limitations of a conversational tool with which the knowledge embeddings are to be utilized, or such that only knowledge embeddings that are within a predetermined threshold distance or similarity are selected based on the embedding generated at box 720.

At box 730, a set of knowledge documents corresponding to the knowledge embeddings selected at box 725 is identified. The set of knowledge documents may be identified in any manner, such as where the knowledge embeddings are stored in association with the knowledge documents in a common data store of an edge computing unit.

At box 735, contextual data for the domain and the user is determined. The contextual data may include any information or data relating to a context associated with the domain, or with the user, as well as any contextual information or data relating to a computer system (e.g., an edge computing unit) at a local site or edge location, or any other information or data. In some implementations, the contextual data may include, but need not be limited to, any guidelines or requirements for processing queries received from users, or for generating responses in reply to such queries.

At box 740, a prompt is generated based on the set of text representing the query identified at box 715, the set of knowledge documents corresponding to the selected knowledge embeddings and the contextual data. The prompt may be generated in any manner and according to any function, such as by using a computer function or set of instructions which may be coded in Python or in any other language, as well as syntax or instructions that the set of text regarding the query received from the user, the set of knowledge documents identified at box 730, and the contextual data identified at box 735, which may be amalgamated into a common prompt. The generated prompt may further include any number of tokens that demarcate between portions of the prompt, including but not limited to tokens identifying a beginning of a document and an end of a document, as well as tokens identifying contextual data or system instructions.

At box 745, the prompt is provided as an input to a conversational model, which may in some implementations be a type or variant of a large language model, or "LLM," configured to receive inputs having any number of parameters. The conversational model may rely on one or more transformers or other machine learning models, algorithms or techniques, to receive sequences of words as inputs, and to recursively generate text-based outputs. In some implementations, the conversational model may have a transformer-based architecture having any number or type of activation functions or other attention mechanisms. The conversational model may rely on any positional embeddings, or other embeddings, and execute any normalization techniques. The conversational model may be further configured to receive inputs including embeddings having any contextual lengths or numbers of tokens. The conversational model may be trained to generate outputs using any type or form of training dataset, including but not limited to domain-specific datasets as well as other data sources that may be publicly or privately obtained, such as repositories, books, papers, code, sites, or others.

At box 750, a response in reply to the prompt is received from the conversational model, and at box 755, data representing the response in reply to the prompt is presented in a pertinent format. For example, in some implementations, where the response includes a set of text identified by the conversational model as a response to the query, the set of text may be transmitted to a device from which the query was received, or another device, and shown to the user on one or more displays. Alternatively, or additionally, a set of audio data representing the set of text in spoken or sung form may be generated and transmitted to the device from which the query received, or another device, and played aloud to the user by one or more speakers. As yet another alternative, the edge computing unit may identify one or more images based on the set of text, and transmit such images to a device from which the query was received, or another device, which may display such images to the user on one or more displays.

At box 760, whether data representing a subsequent query has been received from the user operating at the local site is determined. For example, as is discussed above, the data representing the subsequent query may include another set of audio data, another set of text or another image received from a device of the user after the response is presented to the user in the pertinent format at box 755. The data representing the subsequent query may be in the same form as the data representing the query that was received at box 710, or in a different form.

If no data representing any further queries is received from the user, the process ends.

If data representing a subsequent query has been received from the user, however, then the process advances to box 765, where a set of text corresponding to the data representing the subsequent query is identified. For example, the set of text may be received directly from the user, e.g., in the form of the subsequent query. Alternatively, where the data representing the subsequent query includes audio data, the set of text may be derived by processing the audio data to identify any spoken or sung words represented therein. As yet another alternative, where the data representing the subsequent query includes one or more images, the set of text may be derived by processing the images to determine text-based descriptors of such images.

At box 770, a query embedding is generated from the set of text corresponding to the data representing the subsequent query identified at box 765. For example, the query embedding may be generated by providing the set of text identified at box 765 as an input to one or more of the same models (e.g., transformers) that were used to generate the query embedding at box 720. The query embedding generated based on the set of text identified at box 765 may represent or encapsulate a semantic composition or aspects of that set of text.

At box 775, knowledge embeddings generated from knowledge documents of the knowledge base that are nearest the query embedding generated at box 770 are selected. The knowledge embeddings may be selected in the same manner as the knowledge embeddings that were selected at box 725, or in any other manner, and on any basis, e.g., based on Euclidean distances between such embeddings, cosine similarity or dot product similarity of such embeddings, or in any other manner.

At box 780, a set of knowledge documents corresponding to the knowledge embeddings selected at box 775 is identified. The set of knowledge documents may be identified in the same manner that the set of knowledge documents were identified in box 730, or in any other manner. At box 785, a query most recently received from the user, and a response generated in reply to that query, are added to a record of conversational history with the user. The query and the response may include the data representing the query received at box 710 or the initial prompt generated at box 740, and the initial response to that query generated at box 750, or any other query and response generated following the initial query and the initial response.

At box 790, a prompt is generated based on the set of text corresponding to the data representing the query identified at box 765, the set of documents identified at box 780, the record of conversational history updated at box 785 and the contextual history determined at box 735. The process then returns to box 745, where the prompt generated at box 790 is provided as an input to the conversational model. The prompt generated at box 790 may be provided as an input to the conversational model in any manner. The processes of receiving data representing queries from the user, providing prompts generated from such queries and conversational history as inputs to the conversational model, and returning responses to such prompts to the user May continue as desired by the user, with the conversational history being updated to include queries and responses, as necessary.

Figure 8:
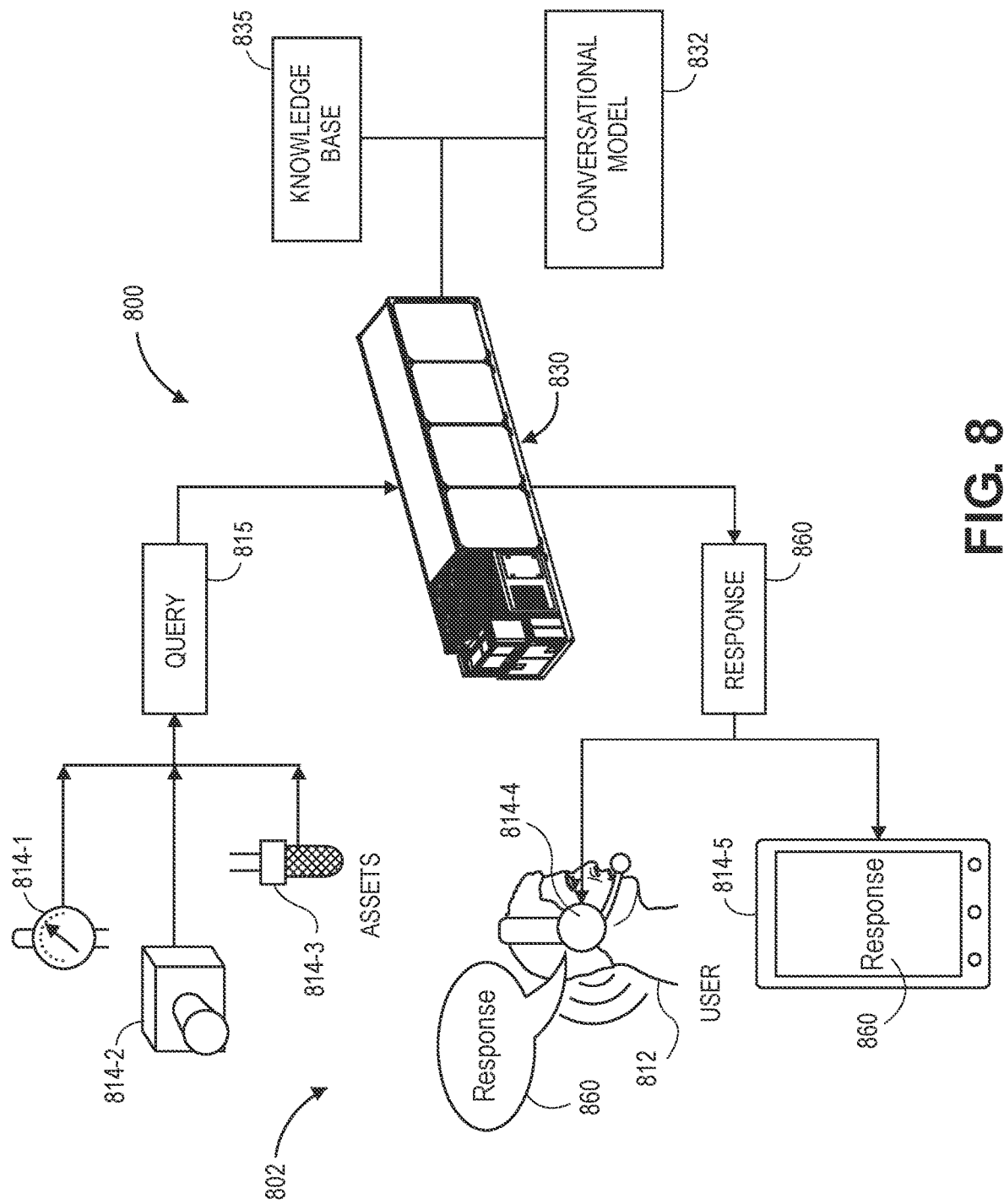
FIG. 8 is a view of aspects of one system in accordance with embodiments of the present disclosure.

As is discussed above, a conversation may be initiated based on information or data received from one or more sensors, devices or assets at a local site or edge location, and need not be initiated based on information or data received directly from a human at the local site or the edge location. Referring to FIG. 8, a view of aspects of one system in accordance with embodiments of the present disclosure is shown.

As is shown in FIG. 8, a system 800 includes a local site 802 and an edge computing unit 830 provided in association with the local site 802. The edge computing unit 830 may be in communication with any number of devices or systems at the local site 802 over a local network, including but not limited to one or more meters 814-1, one or more cameras 814-2, or one or more microphones 814-3. The edge computing unit 830 may also be in communication with any number of devices or systems associated with a worker 812 at the local site 802 over the local network, including but not limited to a headset 814-4 and a mobile device 814-5.

In accordance with implementations of the present disclosure, information or data captured by sensors, devices or assets at the local site 802, such as the meters 814-1, the cameras 814-2, or the microphones 814-3, is processed to generate a query 815. For example, the information or data from which the query 815 is generated may include outputs received from the meters 814-1, which may include sensor readings indicative of conditions at various locations at the local site, as well as images captured by the cameras 814-2, or audio signals captured by the microphones 814-3, or any other information or data, and may be processed to generate sets of text indicative of such outputs, images or audio signals. Embeddings representative of such sets of text may be generated and compared to knowledge embeddings of a knowledge base 835 to identify knowledge documents, and the sets of text and such knowledge documents may be provided as inputs to a conversational model 832. Alternatively, the outputs, images or audio signals may be processed with respect to one or more sets of rules, to determine whether any of such outputs, images or audio signals is indicative of a condition for which relevant information may be identified and presented to the worker 812.

Once the query 815 has been received, the edge computing unit 830 may select a response 860, e.g., by providing the query 815 as an input to the conversational model 832, and identifying the response 860 based at least in part on an output received in response to the input. Data representing the response 860 may then be transmitted to the headset 814-4 or the mobile device 814-5 over the local network and presented to the worker 812 in any relevant manner.

Although some embodiments of the present disclosure show the use of edge computing units in support of operations in one or more industrial applications or functions, those of ordinary skill in the pertinent arts will realize that the systems and methods of the present disclosure are not so limited. Rather, the systems and methods of the present disclosure may be utilized in connection with any operations, and in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures may indicate the same or similar items or features.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, a storage medium can be integral to a processor, and can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
generating a first plurality of embeddings, wherein each one of the first plurality of embeddings is generated based at least in part on one of a first plurality of documents, wherein each one of the first plurality of documents relates at least in part to a domain, and wherein the domain relates at least in part to at least one of an activity or an operation performed at a location, equipment at the location, a natural resource at the location or at least one person at the location;

storing the first plurality of embeddings and the first plurality of documents on a first system provided at the location, wherein each one of the first plurality of embeddings is stored in association with the one of the first plurality of documents from which the one of the first plurality of embeddings was generated;

receiving, by the first system, first data from a second system provided at the location, wherein the second system is associated with the domain;

deriving, by the first system, a first query based at least in part on the first data;

generating, by the first system, a first embedding based at least in part on the first query;

identifying, by the first system, a second plurality of embeddings, wherein the second plurality of embeddings comprises a predetermined number of the first plurality of embeddings similar to the first embedding;

generating, by the first system, a first prompt based at least in part on the first data and a second plurality of documents, wherein each one of the second plurality of documents is one of the first plurality of documents from which one of the second plurality of embeddings was generated;

providing, by the first system, at least the first prompt as a first input to a first model;

identifying, by the first system, a first response to the first query based at least in part on a first output received from the first model in reply to the first input;

transmitting, by the first system, second data representing the first response to one of the second system or a third system provided at the location; and causing the first response to be presented to the at least one person at the location by the one of the second system or the third system based at least in part on the second data.

2. The method of claim 1, wherein generating the first plurality of embeddings comprises:

providing each one of the first plurality of documents as inputs to a second model, wherein the second model comprises at least a first transformer, and wherein the second model is configured to generate an embedding within a vector space having a predetermined number of dimensions based at least in part on a document; and wherein each one of the first plurality of embeddings was generated based at least in part on an output received from the second model in response to one of the inputs to the second model, and wherein generating the first embedding comprises:
providing at least a portion of the first data as an input to the second model,
wherein the first embedding is generated based at least in part on an output received from the second model in response to the input.

3. The method of claim 2, wherein providing each one of the first plurality of documents as inputs to the second model comprises:

generating each one of the first plurality of documents based at least in part on a third plurality of documents, wherein at least one of the first plurality of documents is generated by amalgamating at least a first portion of one of the third plurality of documents and a second portion of the one of the third plurality of documents.

4. The method of claim 2, wherein the second model is a large language model having a transformer-based architecture, and wherein the large language model is trained based at least in part on a training dataset including sets of text representing a plurality of questions associated with the domain and sets of text representing at least one answer to each of the questions.

5. The method of claim 1, wherein at least one of the first plurality of documents comprises:

a first set of text corresponding to a question relating to the domain; and a second set of text corresponding to an answer to the question.

6. The method of claim 1, wherein generating the first prompt comprises:

concatenating at least a portion of the first data, at least a portion of each one of the second plurality of documents, and contextual data relating to at least one of the domain, the location or the at least one person at the location.

7. The method of claim 1, wherein the first data comprises at least one of:

a set of text entered into at least one of the second system or the third system by the at least one person at the location;

audio data captured by at least one of the second system or the third system; or at least one image captured by at least one of the second system or the third system.

8. The method of claim 1, wherein the second data representing the first response is transmitted to the one of the second system or the third system at a first time, and wherein the method further comprises:

receiving, by the first system, third data from the one of the second system or the third system at a second time, wherein the second time follows the first time;

deriving, by the first system, a second query based at least in part on the third data;

generating, by the first system, a second embedding based at least in part on the second query;

identifying, by the first system, a third plurality of embeddings, wherein the third plurality of embeddings comprises a predetermined number of the first plurality of embeddings similar to the second embedding;

generating, by the first system, a second prompt based at least in part on the second data, the first data, the first response, and a third plurality of documents, wherein each one of the third plurality of documents is one of the first plurality of documents from which one of the third plurality of embeddings was generated;

providing, by the first system, at least the second prompt as a second input to the first model;

identifying, by the first system, a second response to the second query based at least in part on a second output received from the first model in reply to the second input; and transmitting, by the first system, fourth data representing the second response to the one of the second system or the third system.

9. The method of claim 1, wherein the first system is an edge computing unit provided at the location, and
wherein the edge computing unit comprises a containerized system having:
at least one server rack;
at least one power unit;
at least one environmental control system; and
at least one isolation system.

10. The method of claim 1, wherein the second system comprises at least one of a smartphone, a tablet computer, a sensor, a meter, a gauge, or a camera.

11. The method of claim 10, wherein the second data is transmitted to the third system, and
wherein the third system is associated with the at least one person at the location.

12. The method of claim 1, wherein the second system is a headset worn by the at least one person at the location,
wherein the headset comprises at least one microphone and at least one of a speaker or a display,
wherein the first data is audio data captured by the at least one microphone,
wherein the second data comprises at least one of audio data or video data transmitted to the second system, and
wherein the first response is presented to the at least one person by at least one of the speaker or the display based at least in part on the second data.

13. The method of claim 1, wherein the second system comprises at least one sensor provided at the location,
wherein the third system is a headset worn by the at least one person at the location,
wherein the headset comprises at least one of a speaker or a display,
wherein the first data is captured by the at least one sensor,
wherein the second data comprises at least one of audio data or video data transmitted to the second system, and
wherein the first response is presented to the at least one person by at least one of the speaker or the display based at least in part on the second data.

14. A method comprising:
receiving, by a first system provided at a location, first data representing a first query from a second system provided at the location, wherein the location is associated with a domain, and wherein the domain relates to at least one of:
an activity or an operation performed at the location;
equipment at the location;
a natural resource at the location; or
at least a first person at the location;
providing, by the first system, at least a portion of the first data as a first input to a first model, wherein the first model comprises at least a first transformer, and wherein the first model is configured to generate an embedding within a vector space having a predetermined number of dimensions based at least in part on a document;
generating, by the first system, a first embedding based at least in part on a first output received from the first model in response to the first input;
identifying, by the first system, a first plurality of embeddings that are similar to the first embedding, wherein each one of the first plurality of embeddings is stored in association with one of a first plurality of documents of a knowledge base;
generating, by the first system, a first prompt based at least in part on the first data and the first plurality of documents of the knowledge base;
providing, by the first system, at least the first prompt as a second input to a second model;
identifying, by the first system, a first response to the first query based at least in part on a second output received from the second model in reply to the second input;
transmitting, by the first system, second data representing the first response to one of the second system or a third system provided at the location; and
causing the first response to be presented to at least one person at the location by the one of the second system or the third system based at least in part on the second data.

15. The method of claim 14, wherein the second system is a sensor configured to capture data of a predetermined type,
wherein the first data is of the predetermined type,
wherein the second data representing the first response is transmitted to the third system,
wherein the second data comprises at least one of audio data or video data,
wherein the third system is a headset worn by one of the first person or a second person at the location,
wherein the headset comprises at least one of a speaker or a display,
wherein the first response is caused to be presented to the one of the first person or the second person by at least one of the speaker or the display based at least in part on the second data.

16. The method of claim 14, wherein identifying the first plurality of embeddings comprises:
providing, by the first system, at least each one of the first plurality of documents as inputs to the first model, wherein each one of the inputs comprises one of the first plurality of documents;
generating, by the first system, at least the first plurality of embeddings based at least in part on outputs generated by the first model in response to the inputs to the first model, wherein each one of the outputs is generated based on one of the first plurality of documents provided to the first model as one of the inputs; and
storing, by the first system, the first plurality of embeddings in association with the first plurality of documents, wherein each one of the first plurality of embeddings is stored in association with the one of the first plurality of documents provided to the first model as the one of the inputs to the first model from which the one of the first plurality of embeddings was generated,
wherein the first model is a large language model having a transformer-based architecture that is trained based at least in part on a training dataset, and
wherein the training dataset includes sets of text representing a plurality of questions associated with the domain and sets of text representing at least one answer to each of the questions.

17. The method of claim 14, wherein the first system is an edge computing unit provided at the location, and
wherein the edge computing unit comprises a containerized system having:
at least one server rack;
at least one power unit;
at least one environmental control system; and
at least one isolation system.

18. A method comprising:
receiving, by a first system provided at a location, first data representing a first query from a second system provided at the location, wherein the location is associated with a domain, wherein the domain relates at least in part to at least one of an activity or an operation performed at a location, equipment at the location, a natural resource at the location or at least one person at the location, and wherein the first data comprises at least one of:
- a set of text entered into the second system;
- sensor data captured by the second system;
- audio data captured by the second system; or
- at least one image captured by the second system;

generating, by the first system, a first embedding based at least in part on the first data;

identifying, by the first system, a first plurality of embeddings that are similar to the first embedding, wherein each one of the first plurality of embeddings is stored in association with one of a first plurality of documents relating to the domain;

generating, by the first system, a first prompt based at least in part on the first data and the first plurality of documents;

providing, by the first system, at least the first prompt as a first input to a first model;

identifying, by the first system, a first response to the first query based at least in part on a first output received from the first model in reply to the first input;

transmitting, by the first system, second data representing the first response to one of the second system or a third system provided at the location; and causing, by the first system, the first response to be presented to the at least one person at the location by the one of the second system or the third system,
- wherein the one of the second system or the third system is a headset worn by the at least one person at the location,
- wherein the headset comprises at least one of a speaker or a display,
- wherein the first data is captured by the one of the second system or the third system,
- wherein the second data comprises at least one of audio data or video data transmitted to the second system, and
- wherein the first response is presented to the at least one person at the location by at least one of the speaker or the display based at least in part on the second data.

19. The method of claim 18, wherein identifying the first plurality of embeddings comprises:
  providing, by the first system, at least each of the first plurality of documents as inputs to a second model, wherein each of the inputs comprises one of the first plurality of documents, wherein the second model comprises at least a first transformer, and wherein the second model is configured to generate an embedding within a vector space having a predetermined number of dimensions based at least in part on a document;
  generating, by the first system, at least the first plurality of embeddings based at least in part on outputs generated by the second model in response to the inputs to the second model, wherein each one of the outputs is generated based on one of the plurality of documents provided to the second model in response to one of the inputs; and
  storing, by the first system, the first plurality of embeddings in association with the first plurality of documents, wherein each one of the first plurality of embeddings is stored in association with the one of the first plurality of documents of the one of the inputs provided to the second model from which the one of the first plurality of embeddings was generated,
  wherein generating the first embedding comprises:
    providing at least a portion of the first data as an input to the second model, wherein the first embedding is generated based at least in part on an output received from the second model in response to the input, and
  wherein the second model is a large language model having a transformer-based architecture that is trained based at least in part on a training dataset, and
  wherein the training dataset includes sets of text representing a plurality of questions associated with the domain and sets of text representing at least one answer to each of the questions.

20. The method of claim 18, wherein the first system is an edge computing unit provided at the location, and
  wherein the edge computing unit comprises a containerized system having:
    at least one server rack;
    at least one power unit;
    at least one environmental control system; and
    at least one isolation system.

* * * * *